United States Patent
Lahoti et al.

(10) Patent No.: US 12,436,761 B2
(45) Date of Patent: Oct. 7, 2025

(54) INSTRUCTION APPLICABLE TO RADIX-3 BUTTERFLY COMPUTATION

(71) Applicant: QUALCOMM Incorporated, San Diego, CA (US)

(72) Inventors: Saurabh Lahoti, Westford, MA (US); Marc Hoffman, Mansfield, MA (US); Srijesh Sudarsanan, Boston, MA (US); Hongfeng Dong, Acton, MA (US)

(73) Assignee: Qualcomm Incorporated, San Diego, CA (US)

( * ) Notice: Subject to any disclaimer, the term of this patent is extended or adjusted under 35 U.S.C. 154(b) by 252 days.

(21) Appl. No.: 17/448,828

(22) Filed: Sep. 24, 2021

(65) Prior Publication Data

US 2023/0102798 A1    Mar. 30, 2023

(51) Int. Cl.
G06F 9/30 (2018.01)

(52) U.S. Cl.
CPC ........ G06F 9/3001 (2013.01); G06F 9/30036 (2013.01)

(58) Field of Classification Search
None
See application file for complete search history.

(56) References Cited

U.S. PATENT DOCUMENTS

| | | | |
|---|---|---|---|
| 7,836,116 B1 | 11/2010 | Goodnight et al. | |
| 8,194,532 B1* | 6/2012 | Whyte | H04L 27/2651 708/409 |
| 2009/0313314 A1 | 12/2009 | Mundarath et al. | |
| 2010/0106944 A1* | 4/2010 | Symes | G06F 9/30021 712/E9.028 |
| 2017/0195281 A1* | 7/2017 | Guo | H04L 27/2636 |
| 2019/0102190 A1* | 4/2019 | Madduri | G06F 9/30036 |

OTHER PUBLICATIONS

Tanenbaum, Structured Computer Organization, 1984, second edition, pp. 10-12 (Year: 1984).*
Tanenbaum, Structured Computer Organization, 2013, sixth edition (Year: 2013).*
International Search Report and Written Opinion—PCT/US2022/075405—ISA/EPO—Nov. 28, 2022.

* cited by examiner

*Primary Examiner* — John M Lindlof
(74) *Attorney, Agent, or Firm* — Moore IP

(57) ABSTRACT

A device includes a processor and a memory configured to store instructions. The processor is configured to receive a particular instruction from among the instructions and to execute the particular instruction to generate first output data corresponding to a sum of first input data and second input data. The processor is also configured to execute the particular instruction to perform a divide operation on the second input data and to generate second output data corresponding to a difference of the first input data and a result of the divide operation.

30 Claims, 13 Drawing Sheets

INSTRUCTION APPLICABLE TO RADIX-3 BUTTERFLY COMPUTATION

I. FIELD

The present disclosure is generally related to processor instructions, and more particularly to instructions that are usable during computation of discrete Fourier transforms.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices often incorporate functionality that is computationally intensive. For example, processors in wireless telephones may be adapted to perform signal processing operations, such as to convert input signals from a time domain to a frequency domain, process the input signals in the frequency domain, and convert the processed signals back to the time domain. A Fourier transform is a mathematical algorithm for converting a signal from a time domain to a frequency domain. A fast Fourier transform (FFT) is an efficient algorithm for computing a discrete Fourier transform (DFT) of digitized time domain input signals. A set of data (i.e., input signals) in the time domain may be converted to the frequency domain using a FFT for further signal processing and then converted back to the time domain (e.g., using an inverse FFT (IFFT) operation).

Increasing processing resources in a portable electronic device, such as by using more powerful processor cores, a greater number of processor cores, or both, can improve the device's ability to perform intensive computational functions, such as FFT. However, the use of more powerful processor cores, a greater number of processor cores, or both, typically results in increases in cost and power consumption, both of which may impact user satisfaction with the portable electronic device. Alternatively, improving the efficiency with which a processor performs intensive computational functions can provide improved device performance for a user without also increasing cost and power consumption.

III. SUMMARY

According to one implementation of the present disclosure, a device includes a memory configured to store instructions. The device also includes a processor configured to receive a particular instruction from among the instructions and to execute the particular instruction to generate first output data corresponding to a sum of first input data and second input data. The processor is configured to execute the particular instruction to perform a divide operation on the second input data. The processor is also configured to execute the particular instruction to generate second output data corresponding to a difference of the first input data and a result of the divide operation.

According to another implementation of the present disclosure, a method of executing a particular instruction includes generating, at a processor, first output data of the particular instruction. The first output data corresponds to a sum of first input data and second input data of the particular instruction. The method includes performing, at the processor, a divide operation on the second input data. The method also includes generating, at the processor, second output data of the particular instruction. The second output data corresponds to a difference of the first input data and a result of the divide operation.

According to another implementation of the present disclosure, a non-transitory computer-readable medium stores instructions that, when executed by one or more processors, cause the one or more processors to, during execution of a particular instruction, generate first output data corresponding to a sum of first input data and second input data. The instructions, when executed by one or more processors, cause the one or more processors to, during execution of the particular instruction, perform a divide operation on the second input data. The instructions, when executed by one or more processors, cause the one or more processors to, during execution of a particular instruction, generate second output data corresponding to a difference of the first input data and a result of the divide operation.

According to another implementation of the present disclosure, an apparatus includes means for storing a particular instruction and means for executing the particular instruction. The means for executing the particular instruction includes means for generating first output data of the particular instruction corresponding to a sum of first input data and second input data of the particular instruction. The means for executing the particular instruction includes means for performing a divide operation on the second input data. The means for executing the particular instruction also includes means for generating second output data of the particular instruction, the second output data corresponding to a difference of the first input data and a result of the divide operation.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

An instruction applicable to radix-3 butterfly computations (e.g., computations that combine the results of three smaller DFTs into a larger DFT), and systems and methods of executing the instruction, are disclosed. Although increasing processing resources in a portable electronic device, such as by using more powerful processor cores, a greater number of processor cores, or both, can improve the device's ability to perform intensive computational functions, the use of more powerful processor cores, a greater number of processor cores, or both, typically results in increases in cost and power consumption, both of which may impact user satisfaction with the portable electronic device.

The disclosed instruction is executed to process first input data and second input data and generate first output data and second output data. The first output data corresponds to the sum of the first input data and the second input data. The second output data corresponds to the difference of the first input data and the result of performing a division operation on the second input data. For example, the division operation can correspond to a divide-by-two operation.

One illustrative, non-limiting use of the instruction is during radix-3 butterfly computations of a DFT, in which the single instruction can replace a sequence of multiple conventional instructions, generating the first output data and the second output data using fewer processor cycles as compared to conventional techniques. By reducing the number of instructions executed, the efficiency with which a processor performs intensive computational functions is improved, resulting in improved device performance for a user without also increasing cost and power consumption.

Figure 1:
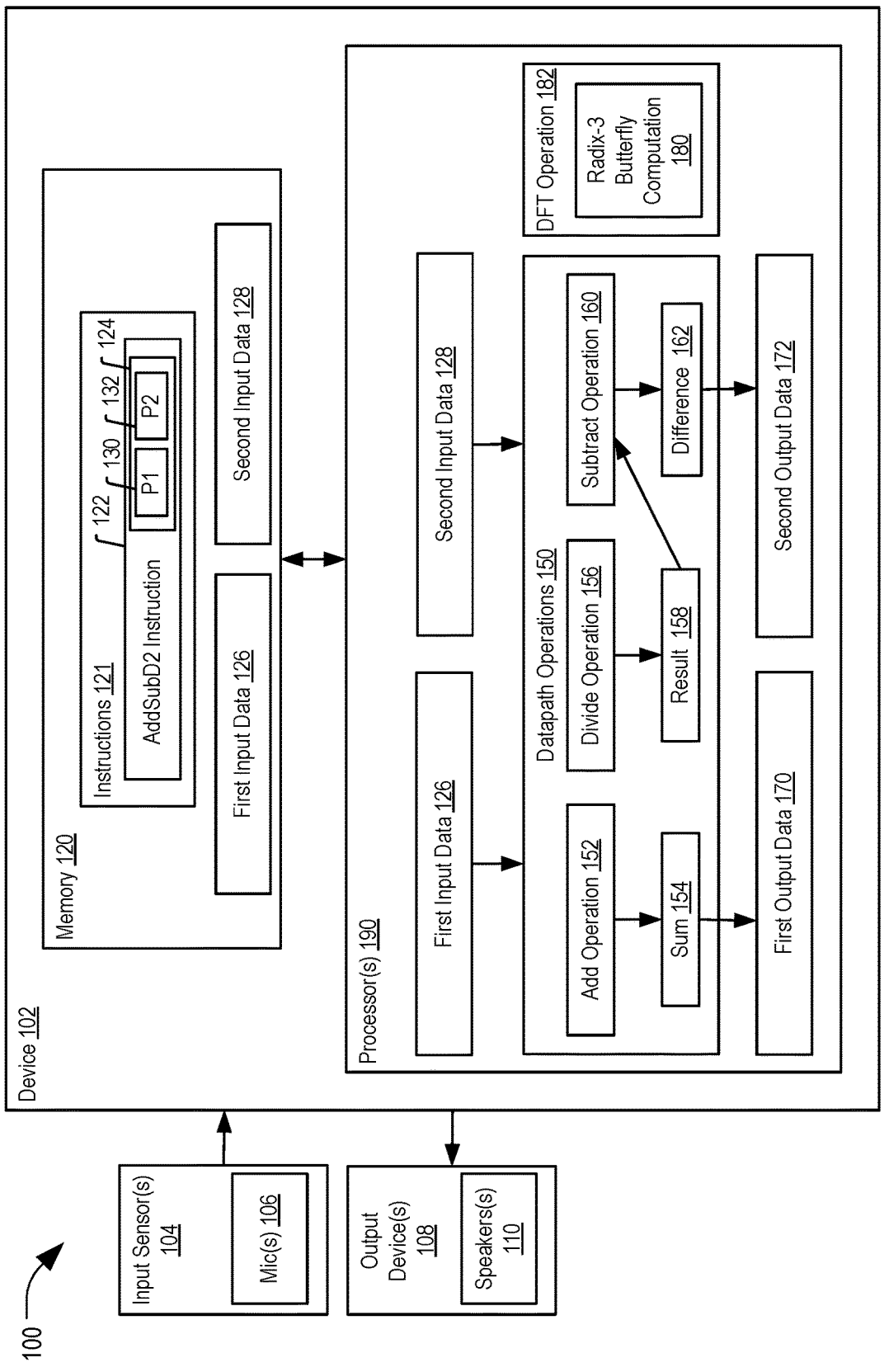
FIG. 1 is a block diagram of a particular illustrative aspect of a system operable to execute an instruction that is applicable to radix-3 butterfly computation, in accordance with some examples of the present disclosure.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 190 of FIG. 1), which indicates that in some implementations the device 102 includes a single processor 190 and in other implementations the device 102 includes multiple processors 190. For ease of reference herein, such features are generally introduced as "one or more" features and are subsequently referred to in the singular unless aspects related to multiple of the features are being described.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system configured to execute an instruction that is applicable to radix-3 butterfly computation is disclosed and generally designated 100. The system 100 includes a device 102 that includes one or more processors 190. The processor 190 is configured to execute a particular instruction 122 that is applicable to radix-3 butterfly computation and that may be included in a set of multiple instructions 121. In some implementations, the device 102 is coupled to one or more input sensors 104, such as one or more microphones (mic(s)) 106, and to one or more output devices 108, such as one or more loudspeakers 110. In a particular implementation, the microphone 106, the loudspeaker 110, or both are external to the device 102. In an alternative implementation, the microphone 106, the loudspeaker 110, or both are integrated in the device 102.

The device 102 includes a memory 120 coupled to the processor 190. The memory 120 is configured to store the instructions 121 including the particular instruction 122. In some implementations, the memory 120 is configured to store first input data 126 and second input data 128 to be processed during execution of the particular instruction 122. Parameters 124 of the particular instruction 122 include a first parameter 130 and a second parameter 132 may indicate source registers or other locations of the first input data 126 and the second input data 128. The parameters 124 may also indicate destination registers or other locations of first output data 170 and second output data 172.

The processor 190 is configured to receive the particular instruction 122 from among the instructions 121 (e.g., during execution of a program) and to execute the particular instruction 122 to generate the first output data 170 corresponding to a sum 154 of the first input data 126 and the second input data 128. To illustrate, datapath operations 150 associated with execution of the particular instruction 122 include an add operation 152, a divide operation 156, and a subtract operation 160. The add operation 152 performs an addition of the first input data 126 with the second input data 128, such as described in further detail with reference to FIG. 5.

Execution of the particular instruction 122 at the processor 190 also includes performing the divide operation 156 on the second input data 128 to generate a result 158. In some implementations, the divide operation 156 corresponds to a "divide by two" operation, and the result 158 has a numerical value corresponding to half of the second input data 128. In some implementations, the divide operation 156 is a "divide by two with rounding" operation, such as described in further detail with reference to FIG. 5.

Execution of the particular instruction 122 at the processor 190 also includes generating the second output data 172 corresponding to a difference 162 of the first input data 126 and the result 158 of the divide operation 156. In an illustrative example, the subtract operation 160 subtracts the result 158 from the first input data 126 to generate the difference 162, which is provided as the second output data 172.

The particular instruction 122 may correspond to an "AddSubD2" instruction, where "Add" indicates addition of the first input data 126 and the second input data 128, and "SubD2" indicates subtraction of the second input data 128, divided by two, from the first input data 126. The particular instruction 122 may have a format of Vdd=addsubd2($Vu, Vv$), where Vu indicates a first input vector register containing the first input data 126, Vv indicates a second input vector register containing the second input data 128, and Vdd indicates a first output vector register to receive the first output data 170 and a second output vector register to receive the second output data 172, as described in further detail with reference to FIG. 5. In some examples, Vu, Vv, Vdd, or a combination thereof, are included in the parameters 124 of the particular instruction 122. In a particular implementation, the particular instruction 122 performs the mathematical equivalent of the pseudocode illustrated in Table 1.

TABLE 1

```
for (i = 0; i < 64; i++) {
    Vdd[i] = sat16(Vu[i] + Vv[i]);
    Vdd[i+64] = sat16(Vu[i] - ((Vv[i] + 0x1) >>1);
}
```

In the example provided in Table 1, "sat16" represents 16-bit saturation, "0x1" is a hexadecimal representation of 1, and ">>1" represents a 1-bit, right bit-shift operation (e.g., divide by 2). Thus, the example of Table 1 performs a rounding operation when it divides by two, and then saturates both outputs to 16 bits. Each of the input vector registers Vv and Vu hold 32 16-bit complex values, enabling evaluation of 32 radix-3 butterflies in one radix-3 block, such as described further with reference to FIG. 2.

In some implementations, the processor 190 is configured to execute the particular instruction 122 during a radix-3 butterfly computation 180 of a discrete Fourier transform operation 182. To illustrate, in some implementations the processor 190 is a single instruction multiple data (SIMD) processor that performs multiple radix-3 butterfly computations 180 in parallel as part of the DFT operation 182. Execution of the particular instruction 122 as part of the radix-3 butterfly computations 180 causes the datapath operations 150 to be performed in parallel on each pair of input values from the first input data 126 and the second input data 128 to generate a pair of output values that form part of the first output data 170 and the second output data 172. Illustrative examples of the datapath operations 150 in a SIMD architecture are described in further detail with reference to FIG. 5.

Although examples herein describe the particular instruction 122 as an "AddSubD2" instruction, in other implementations the particular instruction 122 may have a different name, format, or both, than the described examples. Although examples herein describe the particular instruction 122 as being usable to perform the radix-3 butterfly computations 180 of the DFT operation 182, in other implementations the particular instruction 122 is usable for any other type of application in which a first output is computed as a sum of two inputs and a second output is computed as a difference of one of the two inputs and a result of a division operation on the other of the two inputs.

Although examples herein describe the divide operation 156 as a divide by two operation, in other implementations the divide operation 156 performs division by another amount. In some implementations, the parameters 124 include or indicate a divisor of the divide operation 156 (e.g., an amount by which the second input data 128 is to be divided). In some implementations, the divisor is a power of 2 (e.g., 1, 2, 4, 8, etc.) to enable efficient division via bit shifting, such described in further detail with reference to FIG. 5.

The first input data 126, the second input data 128, or both, may include (or may be generated based on) time-domain data from the input sensor 104, such as audio data samples from the microphone 106, that is processed, using the particular instruction 122 in conjunction with the multiple instructions 121, to generate transform output data in the frequency domain. The frequency domain data may be processed (e.g., to perform noise reduction, feature extraction, etc.) to support audio operations at the device 102, such as audio operations corresponding to a speech interface, telephony or teleconferencing, or virtual reality or augmented reality applications, as illustrative, non-limiting examples. Alternatively, in implementations in which the particular instruction 122 is used in conjunction with an inverse DFT operation, the first input data 126, the second input data 128, or both, may include (or may be generated based on) frequency-domain data, such as audio frequency data, which is processed to generate transform output data in the time domain. The transform output data may be provided as output to the output device 108, such as for playback at the loudspeaker 110.

In some implementations, the processor 190 corresponds to or is included in various types of devices. In an illustrative example, the processor 190 is integrated in at least one of a mobile phone or a tablet computer device, as described with reference to FIG. 7. In other examples, the processor 190 is integrated in a headset device, as described with reference to FIG. 8, a wearable electronic device, as described with reference to FIG. 9, a voice-controlled speaker system, as described with reference to FIG. 10, a camera device, as described with reference to FIG. 11, or a virtual reality, augmented reality, or mixed reality headset, as described with reference to FIG. 12. In another illustrative example, the processor 190 is integrated into a vehicle, such as described further with reference to FIG. 13 and FIG. 14.

During operation, the processor 190 initiates execution of the particular instruction 122 based on the parameters 124. The processor 190 accesses the first input data 126 and the second input data 128 and performs the datapath operations 150 to generate the first output data 170 and the second output data 172.

According to an aspect, each of the first input data 126 and the second input data 128 are vector data, and the processor 190 performs the datapath operations 150 in parallel on each pair of input values. Each of the pairs of input values includes one input value from the first input data 126 and a corresponding input value from the second input data 128 and are processed to generate a corresponding value of the first output data 170 and of the second output data 172.

By performing the add operation 152, the divide operation 156, and the subtract operation 160 to generate the first output data 170 and the second output data 172 during execution of the particular instruction 122 (i.e., during execution of a single instruction), computational efficiency is improved as compared to executing a series of two or more conventional instructions to generate the first output data 170 and the second output data 172. As a result, the number of instructions executed by the processor 190 is reduced as compared to using conventional instructions, reducing latency and power consumption associated with computationally intensive functions such as DFTs. Use of fewer instructions may also reduce code size, resulting in memory savings.

Various modifications to the system 100 can be incorporated in accordance with other implementations. For example, although the input sensor 104 includes the microphone 106, in other implementations the input sensor 104 includes one or more other sensors instead of, or in addition to, the microphone 106. For example, the input sensor 104 can include a camera configured to generate image data that can be used in the first input data 126, the second input data 128, or both. In other implementations, the input sensor 104 can be omitted, such as when the first input data 126, the second input data 128, or both, are received from memory or via transmission.

As another example, although the output device 108 includes the loudspeaker 110, in other implementations the output device 108 includes one or more other devices instead of, or in addition to, the loudspeaker 110. For example, the output device 108 can include a display screen configured to display images represented by the first input data 126, the second input data 128, or both. In other implementations, the output device 108 can be omitted, such as when the first input data 126, the second input data 128, or both are consumed by another application of the device 102, stored, or transmitted to another device.

Figure 2:
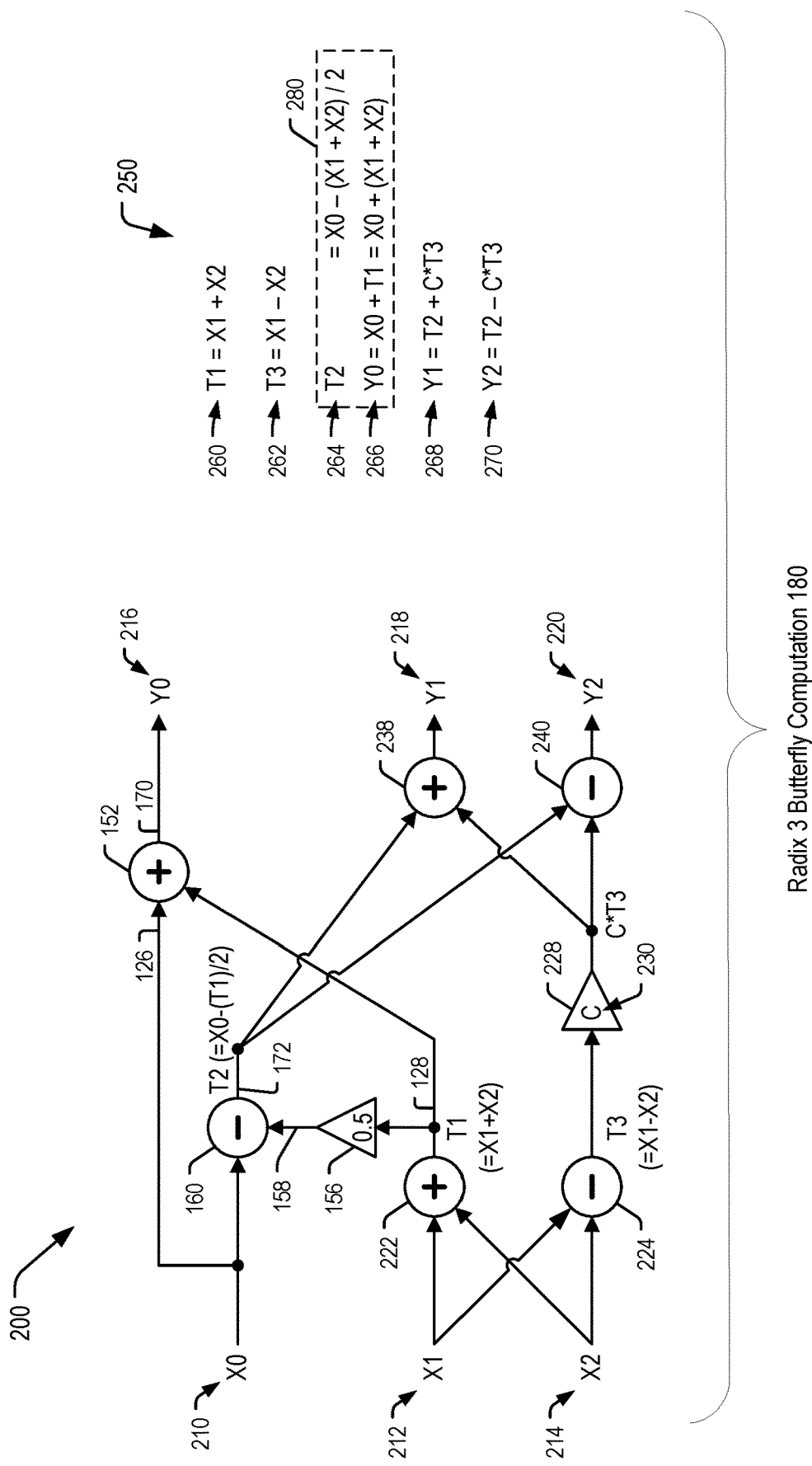
FIG. 2 is a diagram of a particular implementation of operations that may be performed in the system of FIG. 1, in accordance with some examples of the present disclosure.

FIG. 2 depicts an illustrative graphical representation 200 and formulaic representation 250 of an implementation of the radix-3 butterfly computation 180 that may be implemented in the processor 190. The radix-3 butterfly computation 180 computes the DFT or inverse DFT (IDFT) of a 3-point input vector. For example, the DFT may be expressed as:

$$Y(k) = \sum_{n=0}^{2} x(n) e^{-\frac{j\pi k n}{3}}, k = 0, 1, 2$$

where x(n) is a 3-point input vector, j is the square root of −1, and Y(k) is the DFT of x(n).

The radix-3 butterfly computation 180 is configured to generate first transform output data 216 (Y0), second transform output data 218 (Y1), and third transform output data 220 (Y2) based on first transform input data 210 (X0), second transform input data 212 (X1), and third transform input data 214 (X2). The first transform input data 210 (X0) is provided as the first input data 126 to the add operation 152 and is provided as an input to the subtract operation 160. The second transform input data 212 (X1) is provided as an input to an add operation 222 and to a subtract operation 224. The third transform input data 214 (X2) is provided as an input to the add operation 222 and to the subtract operation 224.

The add operation 222 generates an output T1=X1+X2 that corresponds to the second input data 128 and that is input to the divide operation 156 (illustrated as a multiply by cos(π/3) (i.e., multiply by 0.5) operation) and to the add operation 152. The result 158 of the divide operation 156 is input to the subtract operation 160, and the subtract operation 160 generates an output T2=X0−(T1)/2 that corresponds to the second output data 172. The add operation 152 outputs the first transform output data 216 that corresponds to the first output data 170.

The subtract operation 224 generates an output T3=X1−X2 that is input to a multiply operation 228. The multiply operation 228 multiplies T3 by a complex coefficient 230 (C) to generate an output C*T3 that is provided as an input to an add operation 238 and to a subtract operation 240. The complex coefficient 230 (C) has the value:

$C = -j \sin(\pi/3)$ for a DFT; or $C = j \sin(\pi/3)$ for an IDFT.

The add operation 238 receives T2 and C*T3 as inputs and outputs T2+C*T3 as the second transform output data 218 (Y1). The subtract operation 240 receives T2 and C*T3 as inputs and outputs T2−C*T3 as the third transform output data 220 (Y2).

The graphical representation 200 thus illustrates that the first transform output data 216 (Y0) corresponds to the first output data 170. The second transform output data 218 (Y1) corresponds to an addition of the second output data 172 and a multiplicative product (e.g., C*T3) of: the complex coefficient 230 (C), and a first difference (T3) of the second transform input data 212 (X1) and the third transform input data 214 (X2). The third transform output data 220 (Y2) corresponds to a second difference of the second output data 172 and the multiplicative product 232.

The formulaic representation 250 depicts a first operation 260 in which T1 is computed as X1+X2, a second operation 262 in which T3 is computed as X1−X2, a third operation 264 in which T2 is computed as X0−(X1+X2)/2, a fourth operation 266 in which Y0 is computed as X0+(X1+X2), a fifth operation 268 in which Y1 is computed as T2+C*T3, and a sixth operation 270 in which Y2 is computed as T2−C*T3.

Conventionally, a processor would execute multiple instructions to perform the third operation 264 and the fourth operation 266. However, because the particular instruction 122 can be executed to perform an addition of two inputs and a subtraction after performing a divide on one of the inputs, the third operation 264 and the fourth operation 266 can be performed via execution of a single instruction. In particular, the processor 190 is configured to execute the particular instruction 122 using the first transform input data 210 (X0) as the first input data 126 and using a sum (e.g., X1+X2) of the second transform input data 212 (X1) and the third transform input data 214 (X2) as the second input data 128. Thus, the particular instruction 122 enables the radix-3 butterfly computation 180 to be performed by executing fewer instructions, increasing computational efficiency and enabling reduced computation time, power consumption, and memory usage.

Figure 3:
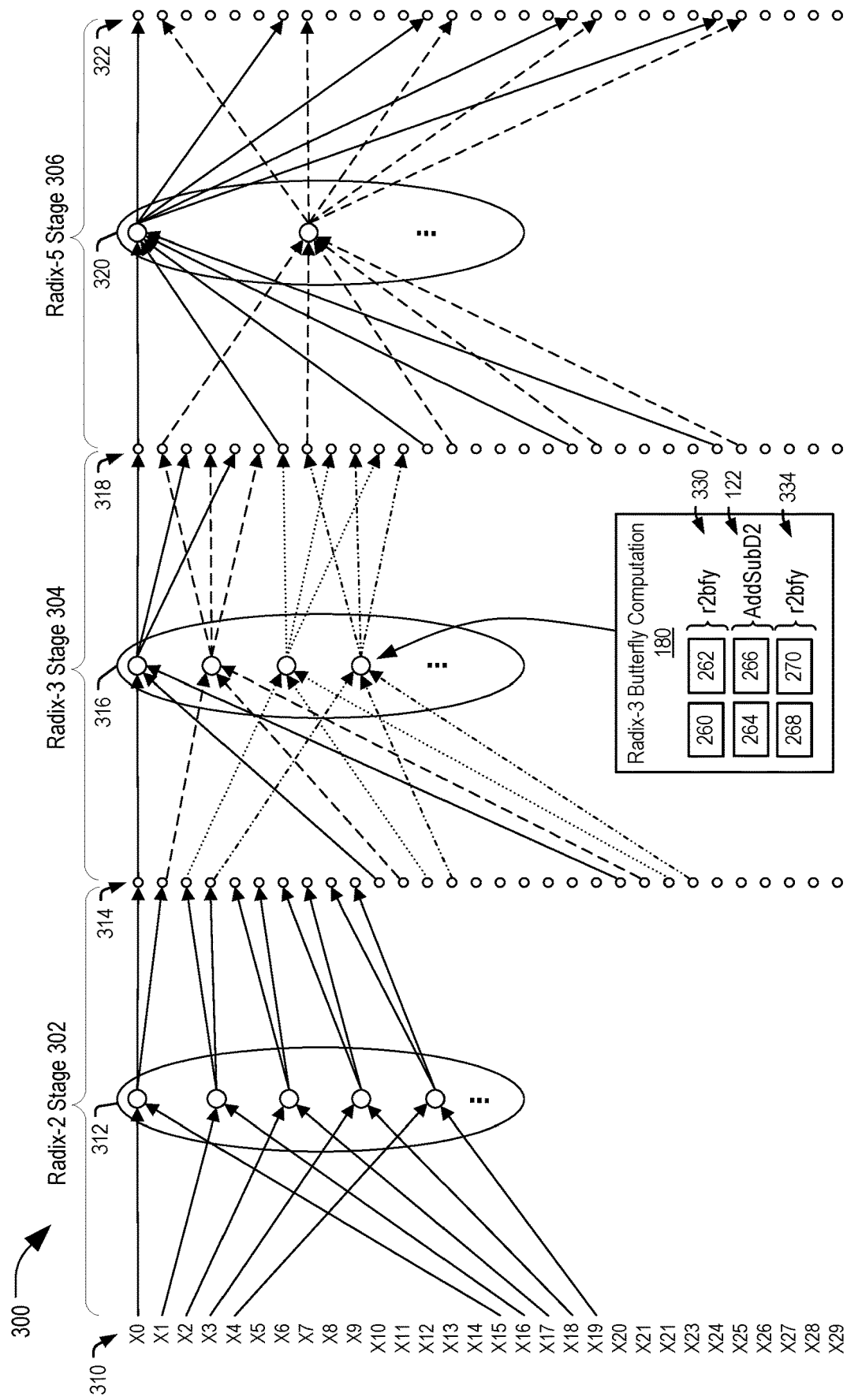
FIG. 3 is a diagram of a particular implementation of a multi-stage DFT including radix-3 butterfly computations that may be performed in the system of FIG. 1, in accordance with some examples of the present disclosure.

Referring to FIG. 3, a particular example of a multi-stage DFT is graphically depicted and generally designated 300. The example depicts using the radix-3 butterfly computations 180 of FIG. 1, computed using the particular instruction 122, as part of implementing a 30 point DFT corresponding to:

$$Y(k) = \sum_{n=0}^{29} x(n) e^{-\frac{j\pi k n}{30}}.$$

An input 310 includes a vector (X) of 30 samples (X0, X1, ... X29), each sample represented as a 16-bit complex number. The input 310 is processed at a radix-2 stage 302 to generate a vector 314. The radix-2 stage 302 includes performing 15 radix-2 butterfly computations 312. Each of the radix-2 butterfly computations 312 processes two samples of the input 310 and outputs two values of the vector 314.

The vector 314 is processed at a radix-3 stage 304 to generate a vector 318. The radix-3 stage 304 includes performing 10 radix-3 butterfly computations 316, each of which corresponds to the radix-3 butterfly computation 180 that processes three inputs from the vector 314 and generates three outputs that are computed, in part, using the particular instruction 122 to generate values of the vector 318. As illustrated, the first operation 260 and the second operation 262 may be computed using a radix-2 butterfly instruction 330 ("r2bfly"), such as described in further detail in FIG. 4), the third operation 264 and the fourth operation 266 are computed using the particular instruction 122, and the fifth operation 268 and the sixth operation 270 may be computed using a radix-2 butterfly instruction 334.

The vector 318 is processed at a radix-5 stage 306 to generate an output 322 (Y) corresponding to the transform of the input 310. The radix-5 stage 306 includes performing 6 radix-5 butterfly computations 320. Each of the radix-5 butterfly computations 320 processes five samples of the vector 318 and outputs five values of the output 322. Although the multi-stage DFT 300 also includes inter-stage twiddle multiplications, such twiddle multiplications are not illustrated for clarity of illustration.

By using the particular instruction 122 in conjunction with radix-3 butterfly computations 316 in the radix-3 stage 304, processor cycles can be reduced as compared to using conventional instructions, resulting in reduced computation time, power consumption, memory usage, or a combination thereof.

Figure 4:
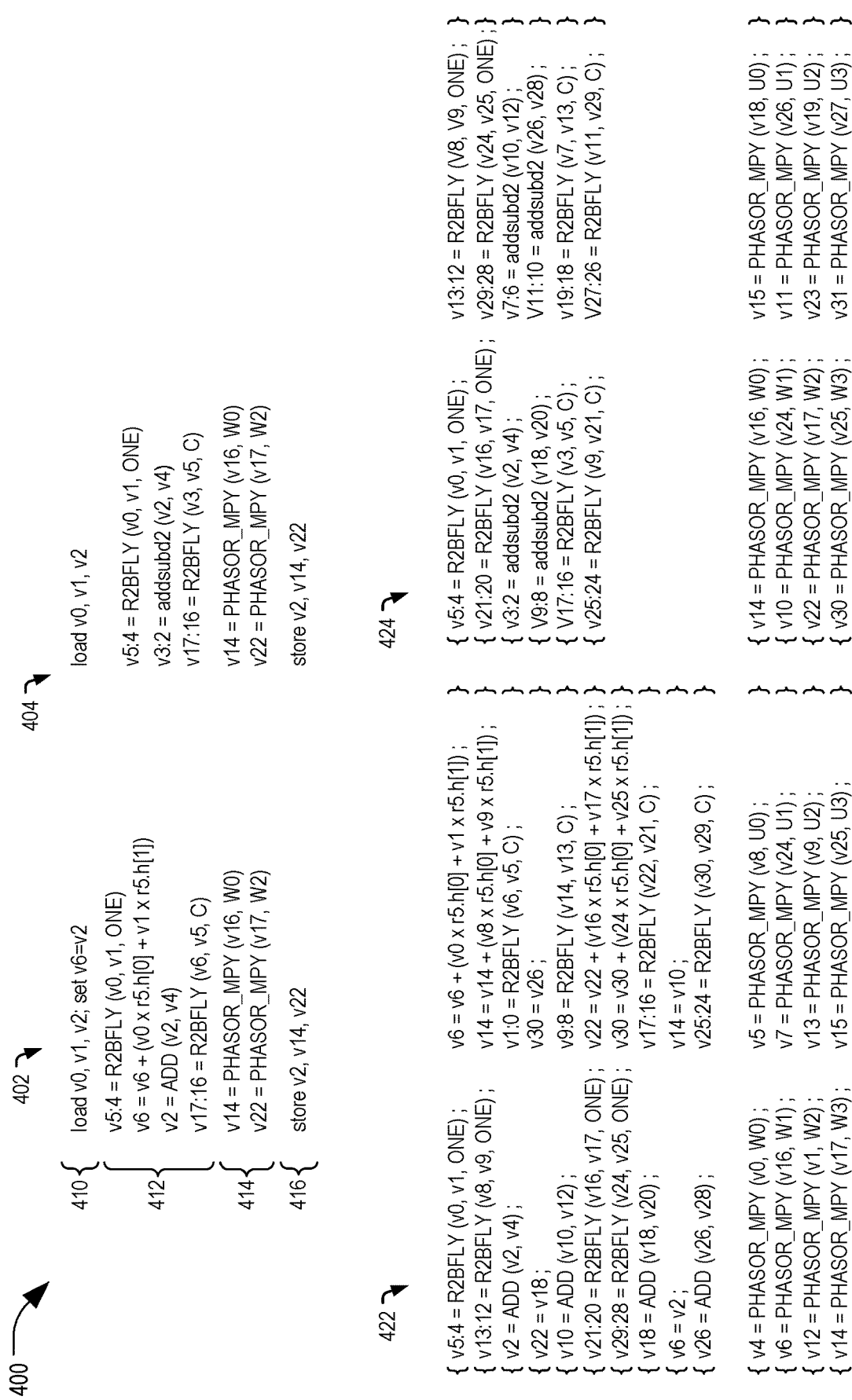
FIG. 4 is a diagram of a particular implementation of pseudocode associated with radix-3 butterfly computations that may be performed in the system of FIG. 1, in accordance with some examples of the present disclosure.

Referring to FIG. 4, multiple examples of pseudocode for radix-3 butterfly computations are depicted and generally designated 400.

A first example 402 depicts a series of conventional instructions (executed from top to bottom) arranged as an initialization portion 410, a computation portion 412, a phasor multiplication portion 414, and a results storage portion 416. In the first example 402, v0, v1, v2, v4, v5, v6, v14, v16, v17, and v22 are vector registers, and r5 is a scalar register storing the value −0.5 in a first halfword and storing the value −0.5 in a second halfword. R2BFLY is a radix-2 butterfly instruction having the format: [y0, y1]=R2BFLY (x0, x1, W), and generates the outputs y0=x0+x1*W and y1=x0−x1*W. PHASOR_MPY is a phasor multiplication instruction having the format: [y]=PHASOR_MPY (x, w), and generates the output y=xe$^{2\pi wj}$.

In the initialization portion 410 of the first example 402, v0, v1, v2, are loaded with x1, x2, and x0, respectively, of FIG. 2, and v6 is initialized to x0. In the computation portion 412 of the first example 402, a first instruction v5:4=R2BFLY (v0, v1, ONE) sets v5=x1−x2 (e.g., T3 of FIGS. 2) and v4=x1+x2 (e.g., T1 of FIG. 2). A second instruction v6=v6+(v0×r5.h[0]+v1×r5.h[1]) sets v6=x0+(x1+x2)/2 (e.g., T2 of FIG. 2). A third instruction v2=ADD (v2, v4) sets v2=x0+x1+x2 (e.g., Y0 of FIG. 2). A fourth instruction V17:16=R2BFLY (v6, v5, C) sets v16=x0+(x1+x2)/2+C(x1−x2) (e.g., Y1 of FIG. 2) and sets v17=x0+(x1+x2)/2−C(x1−x2) (e.g., Y2 of FIG. 2).

The phasor multiplication portion 414 performs post-radix-3 twiddle multiplication. In the phasor multiplication portion 414 of the first example 402, v16 is multiplied by phasor W0 and output to v14, and v17 is multiplied by phasor W2 and output to v22. In the results storage portion 416 of the first example 402, v2, v14, and v22 are stored.

In contrast to the first example 402, a second example 404 generates the same output but uses the particular instruction 122 in the computation portion 412, replacing the two instructions that calculate v6 and v2 with a single instruction. Thus, the number of instructions executed in the computation portion 412 is reduced by 25% (from 4 to 3) as a result of using the particular instruction 122.

A third example 422 and a fourth example 424 illustrate pseudocode of instruction packets to evaluate four sets of radix-3 butterflies (e.g., 32 butterflies in each set, totaling 128 butterflies). Each instruction packet is illustrated as including two instructions that are executed in parallel. For clarity of explanation, additional memory instructions (e.g., load and store instructions) that may also be included in each packet have been omitted.

In the third example 422, v2, v0, v1 are vector register inputs to a first set of radix-3 butterflies, v10, v8, v9 are vector register inputs to a second set of radix-3 butterflies, v18, v19, v20 are vector register inputs to a third set of radix-3 butterflies, and v26, v24, v25 are vector register inputs to a fourth set of radix-3 butterflies. Vector register outputs of the first set of radix-3 butterflies are v2, v0, v1 vector register outputs of the second set of radix-3 butterflies are v10, v8, v9, vector register outputs for the third set of radix-3 butterflies are v18, v16, v18, and vector register outputs for the fourth set of radix-3 butterflies are v26, v24, and v25.

In the fourth example 424, v2, v0, v1 are vector register inputs to a first set of radix-3 butterflies, v10, v8, v9 are vector register inputs to a second set of radix-3 butterflies, v18, v16, v27 are vector register inputs to a third set of radix-3 butterflies, and v26, v24, v25 are vector register inputs to a fourth set of radix-3 butterflies. Vector register outputs of the first set of radix-3 butterflies are v2, v16, v17, vector register outputs of the second set of radix-3 butterflies are v6, v18, v19, vector register outputs for the third set of radix-3 butterflies are v8, v24, v25, and vector register outputs for the fourth set of radix-3 butterflies are v10, v26, and v27.

As illustrated, the third example 422 uses conventional instructions (analogous to the first example 402) and evaluates the 128 radix-3 butterflies in 14 instruction packets. In contrast, the fourth example 424 uses the particular instruction 122 and evaluates the 128 radix-3 butterflies in 10 instruction packets, resulting in a 29% improvement as compared to using conventional instructions.

Figure 5:
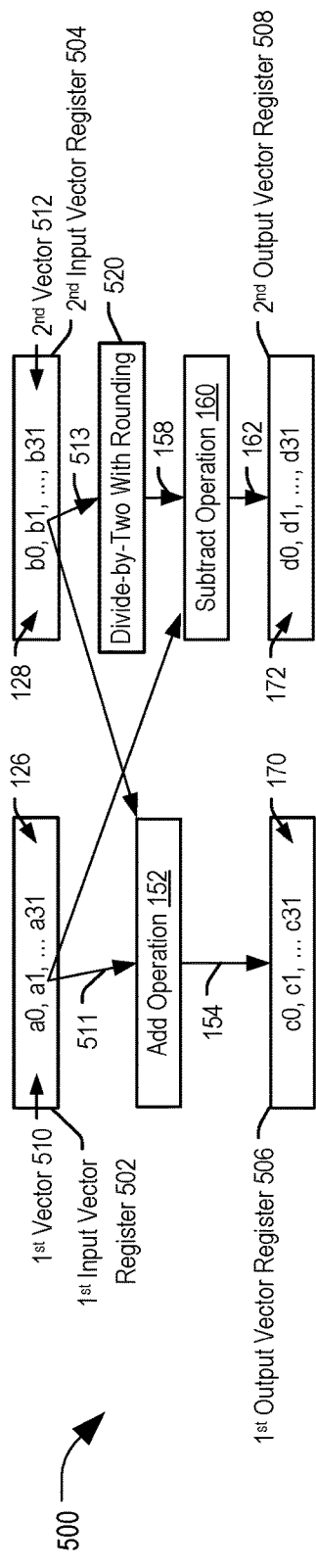
FIG. 5 is a diagram of a particular implementation of components that may be included in the system of FIG. 1, in accordance with some examples of the present disclosure.
Figure 5:
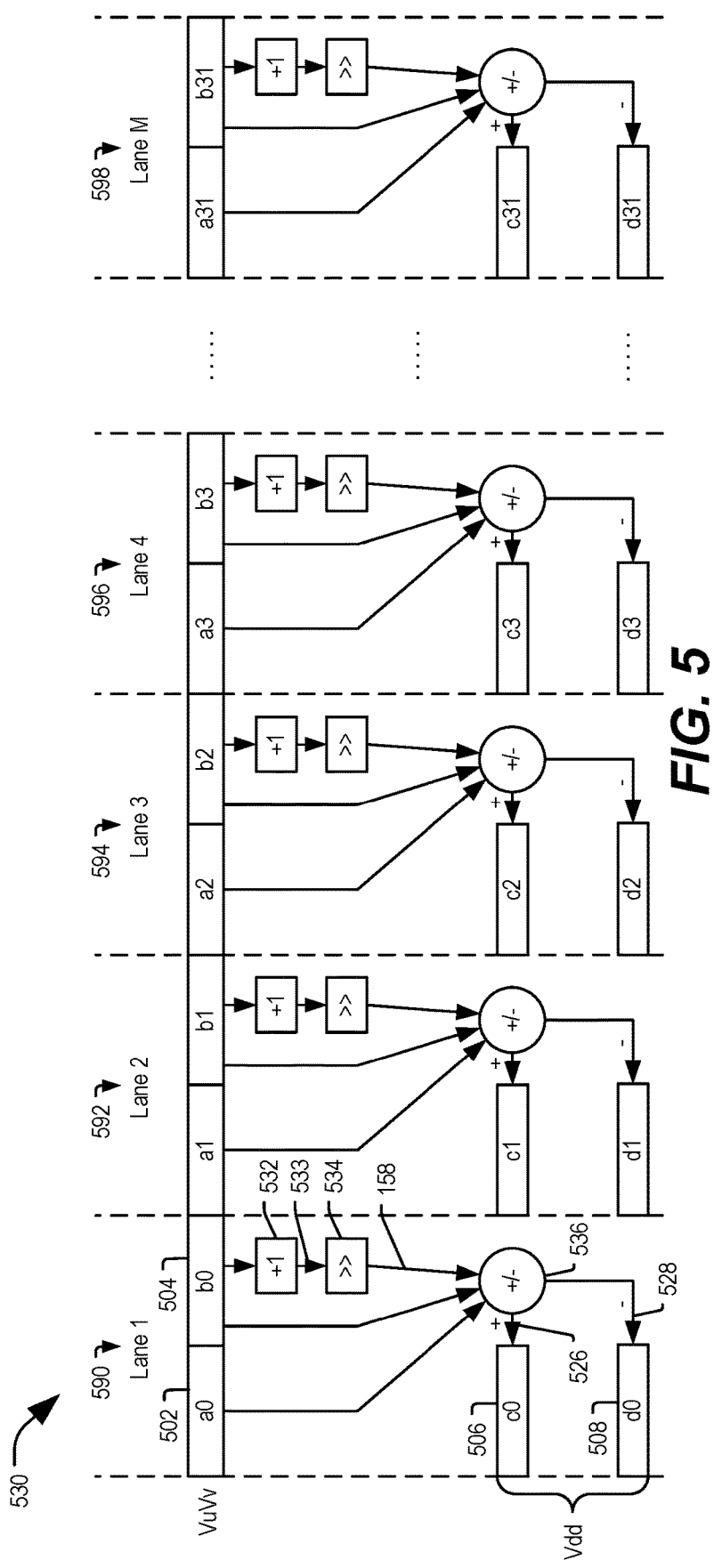

FIG. 5 depicts a first diagram 500 and a second diagram 530 of operations and components that may be implemented in the processor 190 of FIG. 1 according to a particular implementation.

The first diagram 500 illustrates a first input vector register 502, a second input vector register 504, a first output vector register 506, and a second output vector register 508. The first input data 126 corresponds to a first vector 510 ("a") in the first input vector register 502. The first vector 510 has multiple first values, such as a representative first value 511 ("a1"). The second input data 128 corresponds to a second vector 512 ("b") in the second input vector register 504. The second vector 512 has multiple second values, such as a representative second value 513 ("b1"). The processor 190 executes the particular instruction 122 as a vector instruction that operates in parallel on each first value 511 of the multiple first values with a corresponding second value 513 of the multiple second values.

To illustrate, the first value 511 and the second value 513 are added in the add operation 152 and the resulting sum "c1" is included in the sum 154 (e.g., a vector of sum values) that is written to the first output vector register 506 as the first output data 170. The second value 513 is divided in a divide-by-two with rounding operation 520 (e.g., corresponding to a particular implementation of the divide operation 156), and the value resulting from dividing the second value 513 by two, with rounding, is included in the result 158 (e.g., a vector of division result values). The value resulting from dividing the second value 513 by two, with rounding, is subtracted from the first value 511 at the subtract operation 160, and the resulting difference "d1" is included in the difference 162 (e.g., a vector of difference values) that is written to the second output vector register 508 as the second output data 172.

To illustrate, in a particular implementation, the processor 190 is configured, during execution of the particular instruction 122, to access the first vector 510 from the first input vector register 502 indicated by the first parameter 130 (e.g., Vu, indicating the first input vector register 502) of the particular instruction 122, and to access the second vector 512 from the second input vector register 504 indicated by the second parameter 132 (e.g., Vv, indicating the second input vector register 504) of the particular instruction 122. The processor 190 is also configured, during execution of the particular instruction 122, to write the first output data 170 to the first output vector register 506, and to write the second output data 172 to the second output vector register 508.

The second diagram 530 illustrates an example in which the particular instruction 122 is operated by processing a set of inputs in a plurality of computation lanes. For example, the processor 190 can include M computation lanes (designated Lane 1 590, Lane 2 592, Lane 3 594, Lane 4 596, . . . Lane M 598). In the illustrated, non-limiting implementation, M=32.

Each computation lane 590-598 may have access to the first input vector register 502 ("Vu"), the second input vector register 504 ("Vv"), and an output register pair Vdd that includes the first output vector register 506 and the second output vector register 508. Each of the computation lanes 590-598 receives a respective pair of input values (e.g., a pair of data samples) for processing and generates a respective pair of output values. Each pair of input values that is processed in a computation lane includes a first input value (e.g., a0) from the first input vector register 502 and a second input value (e.g., b0) from the second input vector register 504, and each pair of output values includes a first output value (e.g., c0) written to the first output vector register 506 and a second output value (e.g., d0) written to the second output vector register 508. Each of the computation lanes 590-598 is illustrated as including the first input vector register 502, the second input vector register 504, the first output vector register 506, and the second output vector register 508 to illustrate the sources and destinations of the data values associated with that computation lane, and it should be understood that vector registers 502, 504, 506, and 508 are not duplicated in each of the computation lanes 590-598.

During operation, computations may be performed in parallel at each of the computation lanes 590-598. In each computation lane, during each iteration, a first input data sample from the first input vector register 502 is added to a second input data sample from the second input vector register 504 to produce first output data that is stored in the first output vector register 506. In addition, the first input data sample from the first input vector register 502 is added to a result of dividing the second input data sample from the second input vector register 504 by two to produce second output data that is stored in the second output vector register 508.

For example, Lane 1 590 corresponds to a datapath that includes an incrementor 532, a shifter 534, and an arithmetic unit 536 coupled to the shifter 534. The incrementor 532 is configured to increment the second input data sample b0 by one to generate an incremented second input value 533. The shifter 534 is coupled to the incrementor 532 and configured to bit-shift the incremented second input value 533 to generate a result 158 of the divide by two with rounding operation 520. As illustrated, operation of the incrementor 532 and the shifter 534 results in performance of the divide-by-two with rounding operation 520.

The arithmetic unit 536 is configured to generate the first output data 170 in a first phase of execution of the particular instruction 122 and to generate the second output data 172 in a second phase of execution of the particular instruction 122. For example, in the first phase of execution, the arithmetic unit 536 is configured to add a0 and b0 to generate c0 as first output 526. In the second phase of execution, the arithmetic unit 536 is configured to subtract the output of the shifter 534 (e.g., (b0+1)>>2) from a0 to generate d0 as a second output 528. Thus, the first output data generated in Lane 1 590 may be expressed as c0=a0+b0 and the second output data generated in Lane 1 590 may be expressed as d0=a0−floor((b0+1)/2). Similar computations may be performed in parallel in Lanes 2-M.

Figure 6:
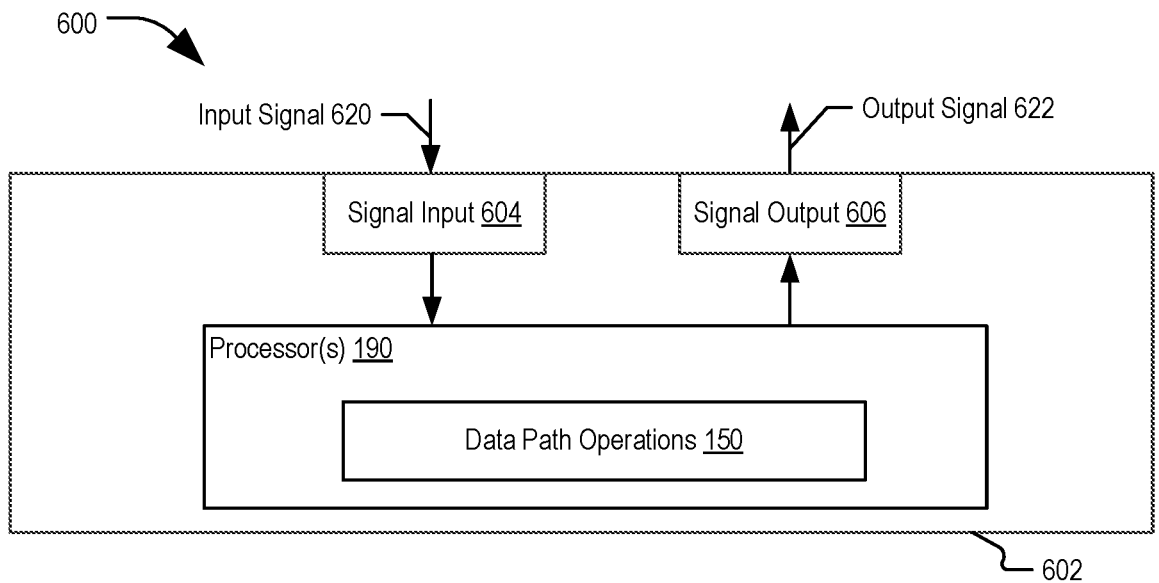
FIG. 6 illustrates an example of an integrated circuit operable to execute an instruction that is applicable to radix-3 butterfly computation, in accordance with some examples of the present disclosure.
Figure 10:
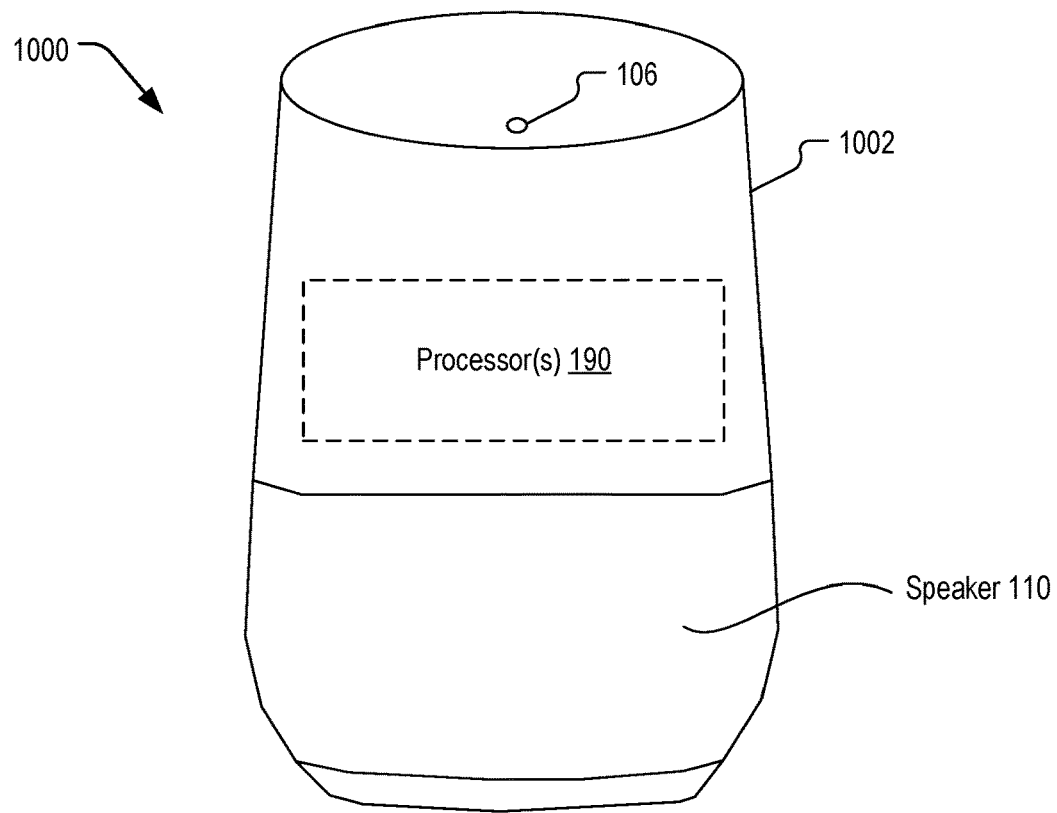
FIG. 10 is a diagram of a voice-controlled speaker system operable to execute an instruction that is applicable to radix-3 butterfly computation, in accordance with some examples of the present disclosure.
Figure 11:
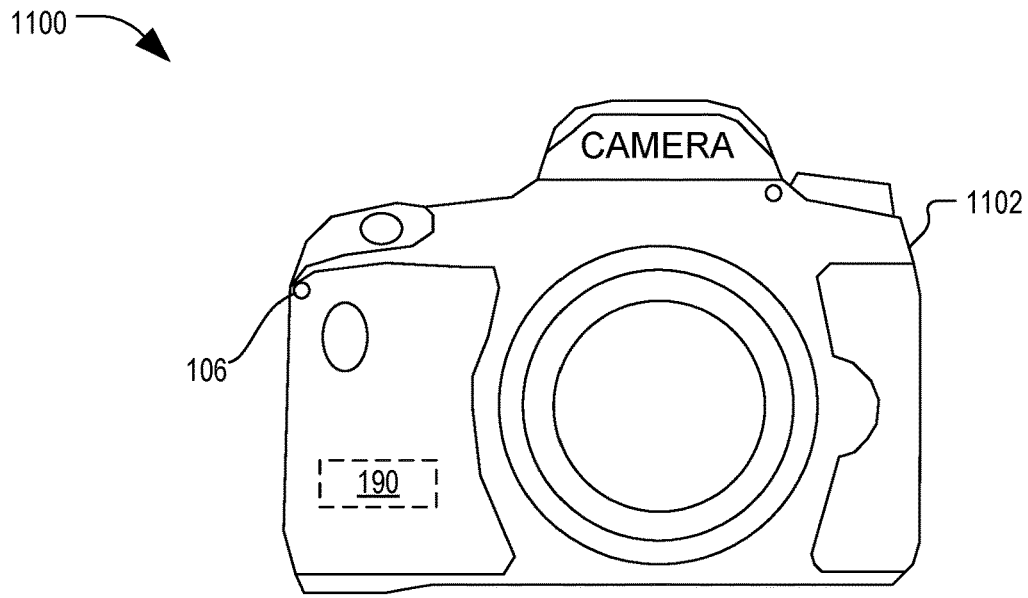
FIG. 11 is a diagram of a camera operable to execute an instruction that is applicable to radix-3 butterfly computation, in accordance with some examples of the present disclosure.
Figure 12:
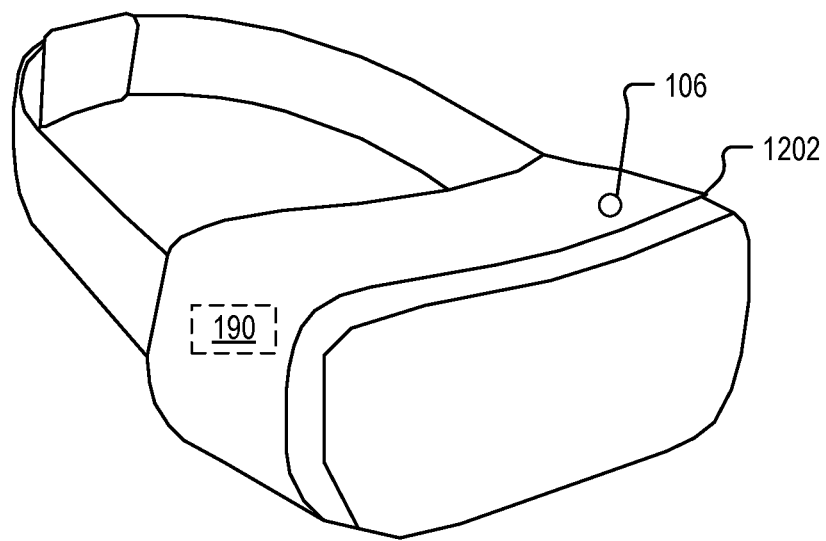
FIG. 12 is a diagram of a headset, such as a virtual reality or augmented reality headset, operable to execute an instruction that is applicable to radix-3 butterfly computation, in accordance with some examples of the present disclosure.
Figure 13:
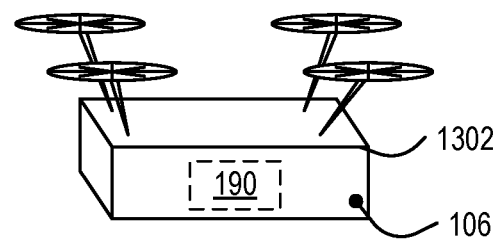
FIG. 13 is a diagram of a first example of a vehicle operable to execute an instruction that is applicable to radix-3 butterfly computation, in accordance with some examples of the present disclosure.
Figure 14:
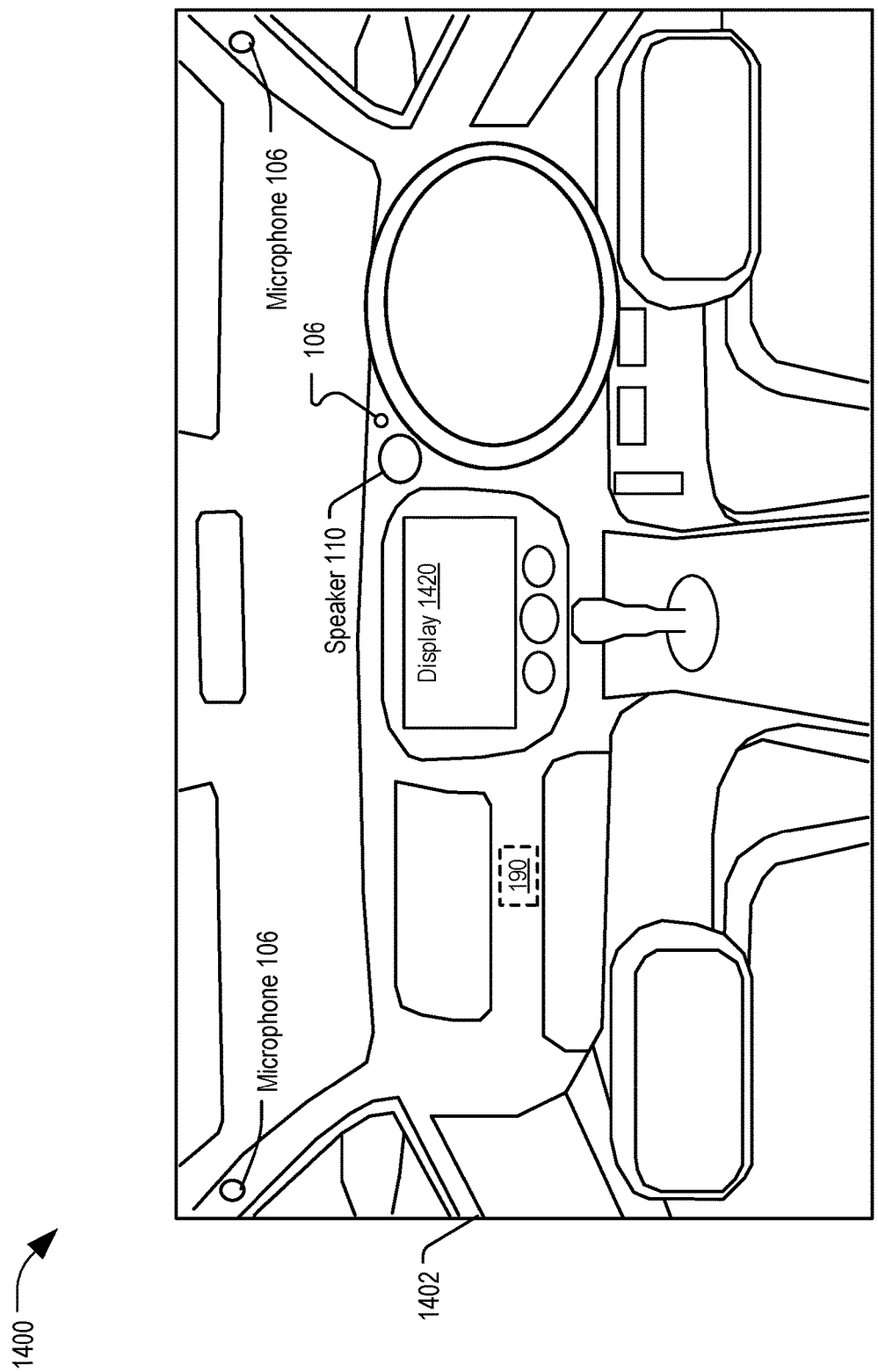
FIG. 14 is a diagram of a second example of a vehicle operable to execute an instruction that is applicable to radix-3 butterfly computation, in accordance with some examples of the present disclosure.
Figure 15:
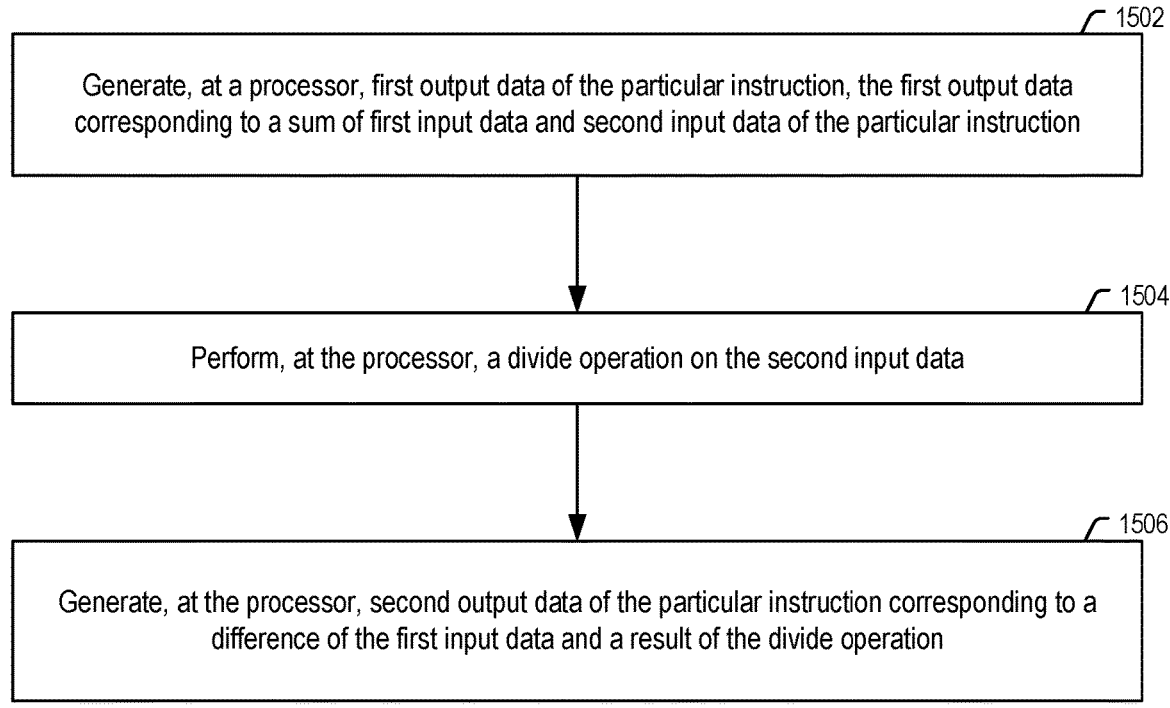
FIG. 15 is a diagram of a particular implementation of a method of executing a particular instruction that may be performed by the device of FIG. 1, in accordance with some examples of the present disclosure.

FIG. 6 depicts an implementation 600 of the device 102 as an integrated circuit 602 that includes the processor 190 of FIG. 1. The integrated circuit 602 also includes a signal input 604, such as one or more bus interfaces, to enable an input signal 620 (e.g., a set of samples of an audio signal, such as the input 310) to be received for processing. The integrated circuit 602 also includes a signal output 606, such as a bus interface, to enable sending of an output signal 622, such as the output 322. The integrated circuit 602 enables implementation of DFT operations using particular instruction 122 in a system that includes other components, such as a mobile phone or tablet as depicted in FIG. 8, a headset as depicted in FIG. 9, a wearable electronic device as depicted in FIG. 10, a voice-controlled speaker system as depicted in FIG. 11, a camera as depicted in FIG. 12, a virtual reality headset or an augmented reality headset as depicted in FIG. 13, or a vehicle as depicted in FIG. 14 or FIG. 15.

Figure 7:
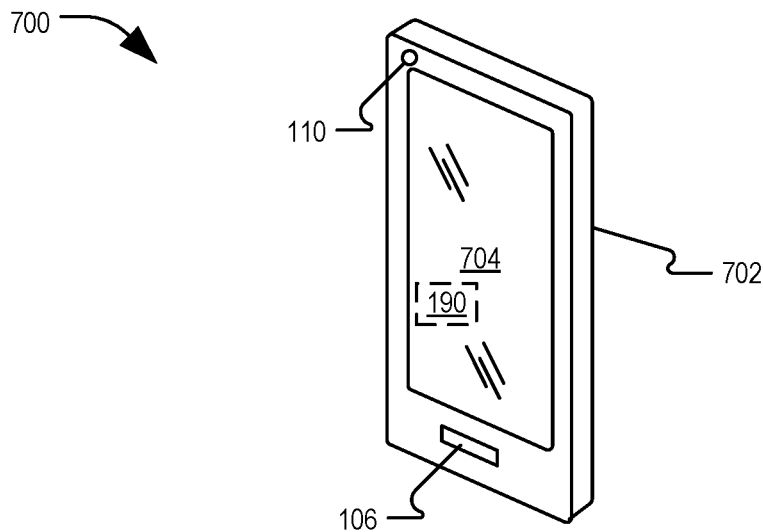
FIG. 7 is a diagram of a mobile device operable to execute an instruction that is applicable to radix-3 butterfly computation, in accordance with some examples of the present disclosure.

FIG. 7 depicts an implementation 700 in which the device 102 includes a mobile device 702, such as a phone or tablet, as illustrative, non-limiting examples. The mobile device 702 includes the microphone 106, the loudspeaker 110, and a display screen 704. Components of the processor 190 are integrated in the mobile device 702 and are illustrated using dashed lines to indicate internal components that are not generally visible to a user of the mobile device 702. In a particular example, the processor 190 performs a radix-3 butterfly operation using the particular instruction 122 to process audio signals received via the microphone 106 to generate frequency domain data, which is then processed to perform one or more operations at the mobile device 702, such as to launch a graphical user interface or otherwise display other information associated with the user's speech at the display screen 704 (e.g., via an integrated "smart assistant" application). In some implementations, the device 102 includes one or more other sensors or components that generate data that can be operated on by a DFT operation (e.g., a multi-stage DFT operation) using the particular instruction 122, such as wireless network signal data, global positioning data or other location data, video or image data from one or more cameras, inertial measurement or other movement data from an inertial measurement unit (e.g., one or more gyroscopes, compasses, accelerometers, etc.), or health data such as heart rate data, oxygen level data, respiratory data, etc. from one or more corresponding sensors, as illustrative, non-limiting examples. The DFT operation generates output data that can be output or that can be processed to generate processed data, either or both of which may be displayed via the display screen 704, output via the loudspeaker 110, transmitted via a wireless network such as another device such as a wearable electronic device (e.g., a smart watch or headset), or output via a haptic output signal, as illustrative, non-limiting examples.

Figure 8:
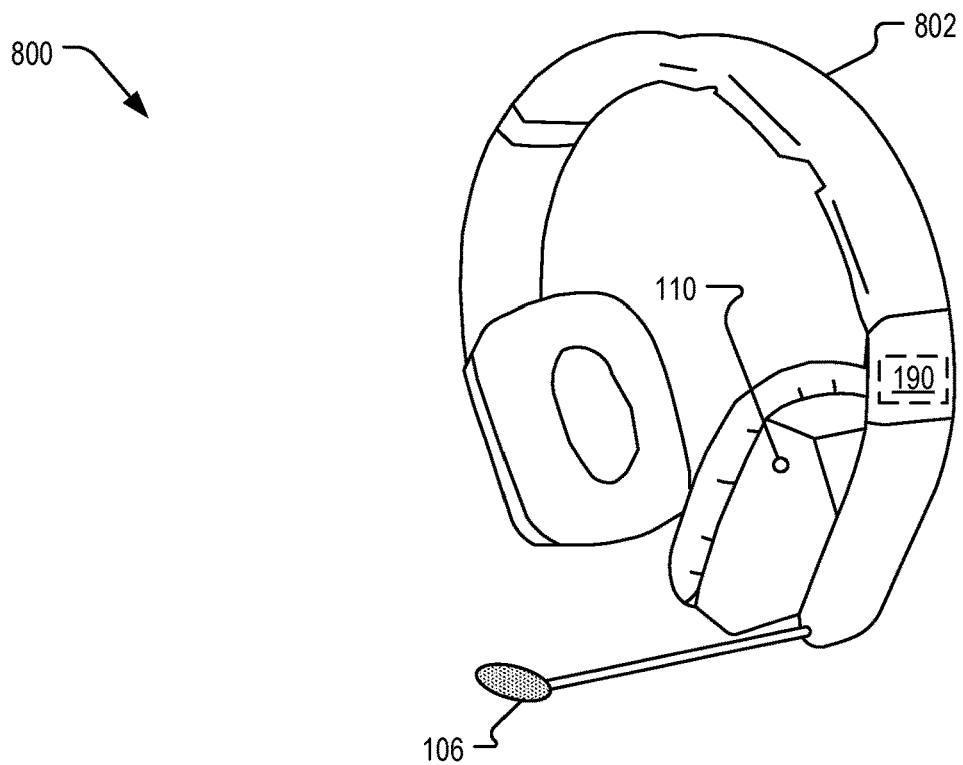
FIG. 8 is a diagram of a headset to execute an instruction that is applicable to radix-3 butterfly computation, in accordance with some examples of the present disclosure.

FIG. 8 depicts an implementation 800 in which the device 102 includes a headset device 802. The headset device 802 includes the microphone 106 and the loudspeaker 110. Components of the processor 190 are integrated in the headset device 802. In a particular example, the processor 190 uses the particular instruction 122 during radix-3 butterfly computations as part of a DFT to process audio signals received via the microphone 106 to generate frequency domain data, which is then processed to cause the headset device 802 to perform one or more operations at the headset device 802.

Figure 9:
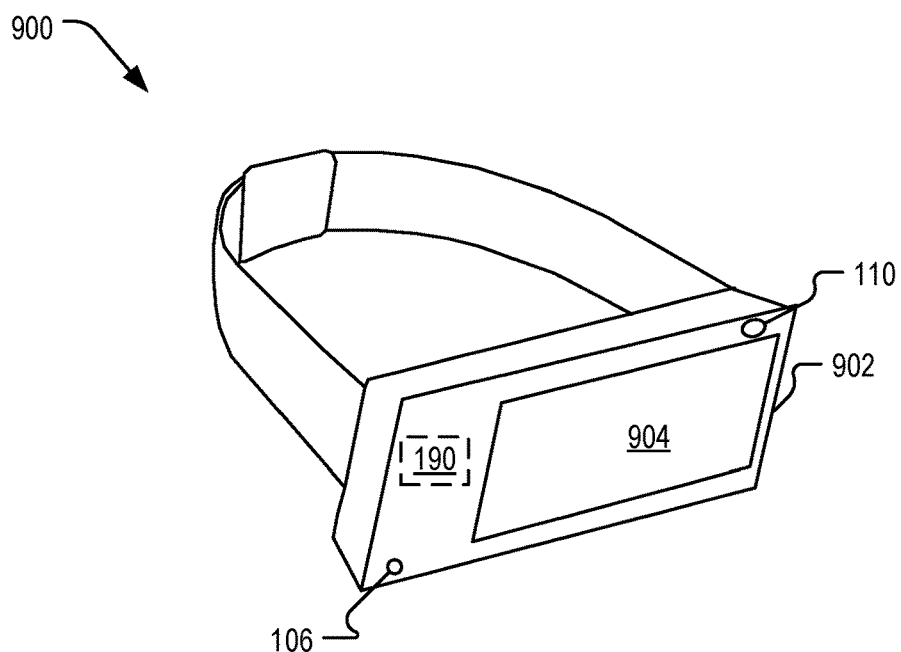
FIG. 9 is a diagram of a wearable electronic device operable to execute an instruction that is applicable to radix-3 butterfly computation, in accordance with some examples of the present disclosure.

FIG. 9 depicts an implementation 900 in which the device 102 includes a wearable electronic device 902, illustrated as a "smart watch." The processor 190, the microphone 106, and the loudspeaker 110 are integrated into the wearable electronic device 902. In a particular example, the processor 190 uses the particular instruction 122 during radix-3 butterfly computations as part of a DFT to process audio signals received via the microphone 106 to generate frequency domain data, which is then processed to perform one or more operations at the wearable electronic device 902, such as to launch a graphical user interface or otherwise display other information associated with the user's speech at a display screen 904 of the wearable electronic device 902. To illustrate, the wearable electronic device 902 may include a display screen that is configured to display a notification based on user speech detected by the wearable electronic device 902. In a particular example, the wearable electronic device 902 includes a haptic device that provides a haptic notification (e.g., vibrates) in response to detection of user voice activity or generation of synthesized speech. For example, the haptic notification can cause a user to look at the wearable electronic device 902 to see a displayed notification indicating detection of a keyword spoken by the user. The wearable electronic device 902 can thus alert a user with a hearing impairment or a user wearing a headset that the user's voice activity is detected.

FIG. 10 is an implementation 1000 in which the device 102 includes a wireless speaker and voice activated device 1002. The wireless speaker and voice activated device 1002 can have wireless network connectivity and is configured to execute an assistant operation. The processor 190, the microphone 106, and the loudspeaker 110 are included in the wireless speaker and voice activated device 1002. During operation, in response to receiving a verbal command, the processor 190 processes audio signals received via the microphone 106, using the particular instruction 122 to perform radix-3 butterfly computations, to generate frequency domain data, which is then processed to perform one or more operations. For example, the wireless speaker and voice activated device 1002 can process execute assistant operations, such as via execution of an integrated assistant application. The assistant operations can include adjusting a temperature, playing music, turning on lights, etc. For example, the assistant operations are performed responsive to receiving a command after a keyword or key phrase (e.g., "hello assistant").

FIG. 11 depicts an implementation 1100 in which the device 102 includes a portable electronic device that corresponds to a camera device 1102. The processor 190, the microphone 106, or a combination thereof, are included in the camera device 1102. During operation, in response to receiving a verbal command the processor 190 processes audio signals received via the microphone 106, using the particular instruction 122 to perform radix-3 butterfly computations, to generate frequency domain data, which is then processed to perform one or more operations. The camera device 1102 can execute operations responsive to spoken user commands, such as to adjust image or video capture settings, image or video playback settings, or image or video capture instructions, as illustrative examples.

FIG. 12 depicts an implementation 1200 in which the device 102 includes a portable electronic device that corresponds to a virtual reality, augmented reality, or mixed reality headset 1202. The processor 190 and the microphone 106 are integrated into the headset 1202. In a particular aspect, the microphone 106 is positioned to primarily capture speech of a user. During operation, in response to capturing user speech, the processor 190 processes audio signals received via the microphone 106, using the particular instruction 122 to perform radix-3 butterfly computations, to generate frequency domain data, which is then processed to perform one or more operations such as speech detection and recognition. A visual interface device is positioned in front of the user's eyes to enable display of augmented reality or virtual reality images or scenes to the user while the headset 1202 is worn. In a particular example, the visual interface device is configured to display a notification indicating user speech detected in the audio signal.

FIG. 13 depicts an implementation 1300 in which the device 102 corresponds to, or is integrated within, a vehicle 1302, illustrated as a manned or unmanned aerial device (e.g., a package delivery drone). The processor 190 and the microphone 106 are integrated into the vehicle 1302. Speech recognition, including using the particular instruction 122 to perform radix-3 butterfly computations to generate frequency domain data, which is then processed to perform one or more operations, can be performed based on audio signals received from the microphone 106 of the vehicle 1302, such as for delivery instructions from an authorized user of the vehicle 1302.

FIG. 14 depicts another implementation 1400 in which the device 102 corresponds to, or is integrated within, a vehicle 1402, illustrated as a car. The vehicle 1402 includes the processor 190, the microphone 106, and the loudspeaker 110. The microphone 106 is positioned to capture utterances of an operator of the vehicle 1402. In some implementations, speech recognition, including using the particular instruction 122 to perform radix-3 butterfly computations to generate frequency domain data, which is then processed to perform one or more operations, can be performed based on audio signals received from the microphone 106 of the vehicle 1402. In a particular implementation, in response to receiving and recognizing a verbal command, a voice activation system initiates one or more operations of the vehicle 1402 based on one or more keywords (e.g., "unlock," "start engine," "play music," "display weather forecast," or another voice command) detected in the first output data 170, such as by providing feedback or information via a display 1420 or the loudspeaker 110.

Referring to FIG. 15, a particular implementation of a method 1500 of executing a particular instruction is shown. In a particular aspect, one or more operations of the method 1500 are performed by at least one of the processor 190, the device 102, the system 100 of FIG. 1, or a combination thereof. According to some aspects, the particular instruction is executed as part of a radix-3 butterfly computation of a discrete Fourier transform operation.

The method 1500 includes generating, at a processor, first output data of the particular instruction, the first output data corresponding to a sum of first input data and second input data of the particular instruction, at 1502. For example, the add operation 152 generates the sum 154 of the first input data 126 and the second input data 128 as the first output data 170.

The method 1500 includes performing, at the processor, a divide operation on the second input data, at 1504. For example, the divide operation 156 operates on the second input data 128 to generate the result 158. In some implementations, the divide operation corresponds to a divide by two with rounding operation, such as the divide by two with rounding operation 520. For example, performing the divide operation can include incrementing the second input data by one to generate an incremented second input value, such as at the incrementor 532, and bit-shifting the incremented second input value, such as at the shifter 534, to generate a result of the divide by two with rounding operation.

The method 1500 includes generating, at the processor, second output data of the particular instruction, the second output data corresponding to a difference of the first input data and a result of the divide operation, at 1506. For example, the subtract operation 160 generates the difference 162 of the first input data 126 and the result 158 as the second output data 172. In some implementations, the first output data is generated in a first phase of execution of the particular instruction, and the second output data is generated in a second phase of execution of the particular instruction, such as the first output 526 and the second output 528 generated by the arithmetic unit 536.

In a particular example, the first input data corresponds to a first vector having multiple first values and the second input data corresponds to a second vector having multiple second values, such as the first vector 510 and the second vector 512 of FIG. 5. The particular instruction may be executed as a vector instruction that operates in parallel on each first value of the multiple first values with a corresponding second value of the multiple second values, sch as described with reference to the computation lanes 590-598.

For example, executing the particular instruction can include accessing the first vector from a first input vector register indicated by a first parameter of the particular instruction and accessing the second vector from a second input vector register indicated by a second parameter of the particular instruction, such as the first input vector register 502 indicated by the first parameter 130 and the second input vector register 504 indicated by the second parameter 132. Executing the particular instruction can also include writing the first output data to a first output vector register and writing the second output data to a second output vector register, such as the first output data 170 written to the first output vector register 506 and the second output data 172 written to the second output vector register 508. In some aspects, the particular instruction has a format of Vdd=addsubd2(Vu, Vv), where Vu indicates the first input vector register, Vv indicates the second input vector register, and Vdd indicates the first output vector register and the second output vector register.

In an example in which the particular instruction is executed as part of a radix-3 butterfly computation of a discrete Fourier transform operation, the radix-3 butterfly computation includes generating first transform output data (e.g., Y0 216 of FIG. 2), second transform output data (e.g., Y1 218), and third transform output data (e.g., Y2 220) based on first transform input data (e.g., X0 210), second transform input data (e.g., X1 212), and third transform input data (e.g., X2 214). The particular instruction may be executed using the first transform input data as the first input data and using a sum of the second transform input data and the third transform input data (e.g., T1 of FIG. 2) as the second input data.

Continuing the example, the method 1500 can also include generating a multiplicative product (e.g., at the multiply operation 228) of: a complex coefficient (e.g., C 230); and a first difference (e.g., T3 of FIG. 2) of the second transform input data and the third transform input data. The method 1500 can include generating the second transform output data as an addition of the second output data and the multiplicative product (e.g., at the add operation 238) and generating the third transform output data as a second difference of the second output data and the multiplicative product (e.g., at the subtract operation 240). The first transform output data (e.g., Y0 216) can correspond to the first output data.

By execution of the particular instruction including generating the first output data corresponding to a sum of first input data and second input data, performing the divide operation, and generating the second output data corresponding to a difference of the first input data and a result of the divide operation, the method 1500 provides improved computational efficiency as compared to executing a series of two or more conventional instructions to generate the first output data and the second output data. As a result, the number of instructions executed can be reduced as compared to using conventional instructions, reducing latency and power consumption associated with computationally intensive functions such as DFTs. Use of fewer instructions may also reduce code size, resulting in memory savings.

The method 1500 of FIG. 15 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 1500 of FIG. 15 may be performed by a processor that executes instructions, such as the processor 190.

Figure 16:
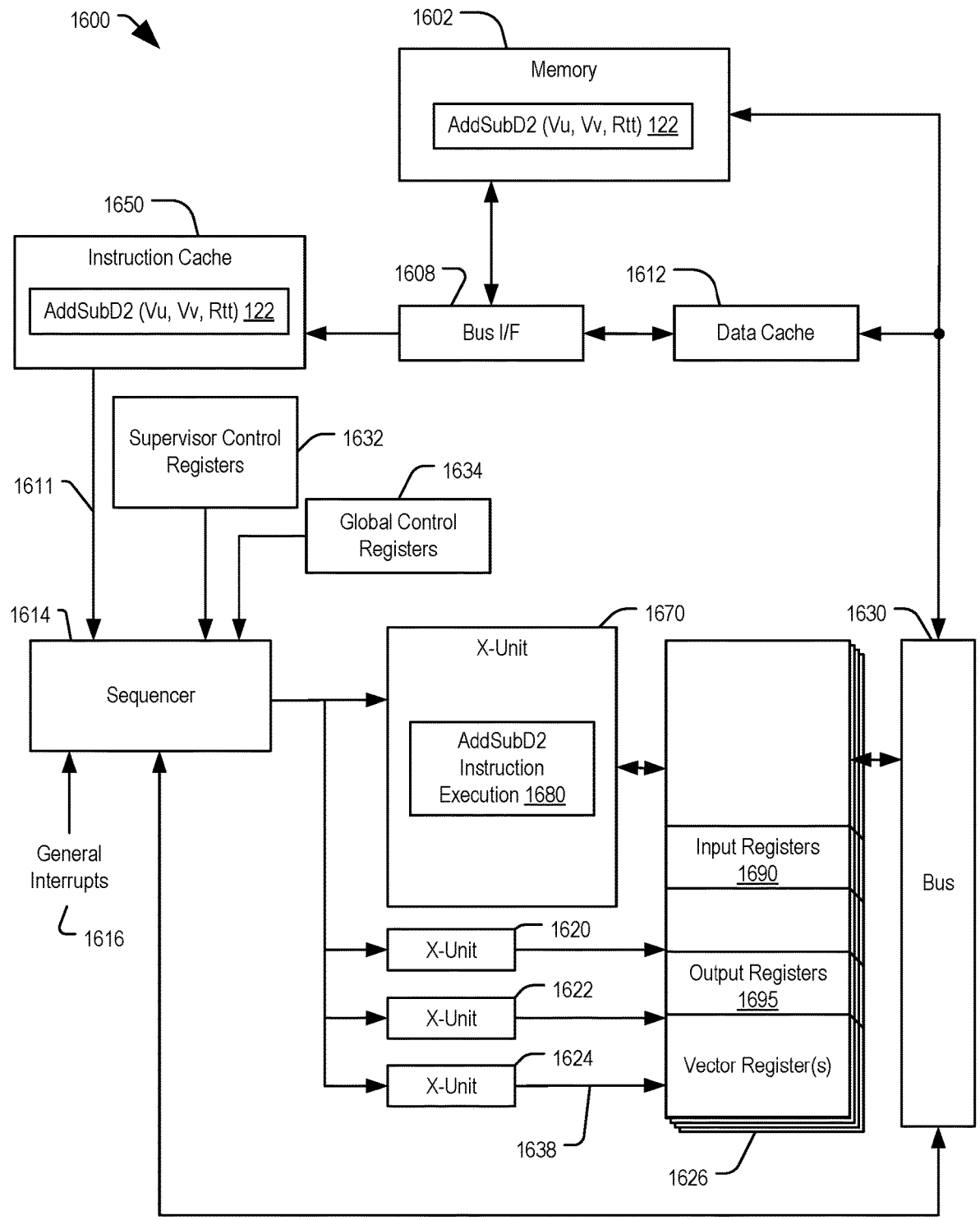
FIG. 16 is a diagram of another particular implementation of a system operable to execute an instruction that is applicable to radix-3 butterfly computation, in accordance with some examples of the present disclosure.

FIG. 16 depicts an implementation of a system 1600 operable to execute a particular instruction applicable to radix-3 butterfly computation. The system 1600 includes a memory 1602 storing the particular instruction 122 of FIG. 1 (e.g., AddSubD2 (Vv, Vu)) and a processor to execute the particular instruction 122.

The memory 1602 may be coupled to an instruction cache 1650 via a bus interface 1608. In a particular implementation, all or a portion of the system 1600 may be integrated into a processor. Alternately, the memory 1602 may be external to the processor. The memory 1602 may send particular instruction 122 to the instruction cache 1650 via the bus interface 1608. The particular instruction 122 may be executed on a set of inputs stored in an input register 1690 to produce output data stored in an output register 1695. The input register 1690 and output register 1695 may be part of a vector register file 1626. Alternately, the set of inputs may be stored in a data cache 1612 or the memory 1602. It should be noted that although the input registers 1690 and the output registers 1695 are illustrated separately, the input registers 1690 and the output registers 1695 may include one or more common registers (i.e., registers that function as both input and output registers). Moreover, there may be any number of input registers 1690 and output registers 1695.

The instruction cache 1650 may be coupled to a sequencer 1614 via a bus 1611. The sequencer 1614 may receive general interrupts 1616, which may be retrieved from an interrupt register (not shown). In a particular implementation, the instruction cache 1650 may be coupled to the sequencer 1614 via a plurality of current instruction registers (not shown), which may be coupled to the bus 1611 and associated with particular threads (e.g., hardware threads) of the processor. In a particular implementation, the processor may be an interleaved multi-threaded processor including six (6) threads.

In a particular implementation, the bus 1611 may be a one-hundred and twenty-eight bit (128-bit) bus and the sequencer 1614 may be configured to retrieve instructions from the instruction cache 1650 via instruction packets, including the particular instruction 122, having a length of thirty-two (32) bits each. The bus 1611 may be coupled to a first instruction execution unit 1670, a second instruction execution unit 1620, a third instruction execution unit 1622, and a fourth instruction execution unit 1624. One or more of the instruction execution units 1670, 1620, 1622, and 1624 may be configured to perform radix-3 butterfly computations (e.g., by executing the particular instruction 122). It should be noted that there may be fewer or more than four instruction execution units. Each instruction execution unit 1670, 1620, 1622, and 1624 may be coupled to the vector register file 1626 via a second bus 1638. The vector register file 1626 may also be coupled to the sequencer 1614, the data cache 1612, and the memory 1602 via a third bus 1630. In a particular implementation, one or more of the instruction execution units 1670, 1620, 1622, and 1624 may be load/store units.

The system 1600 may also include supervisor control registers 1632 and global control registers 1634 to store bits that may be accessed by control logic within the sequencer 1614 to determine whether to accept interrupts (e.g., the general interrupts 1616) and to control execution of instructions.

In a particular implementation, the instruction cache 1650 may issue the particular instruction 122 to any of the instruction execution units 1670, 1620, 1622, and 1624. For example, the execution unit 1670 may receive the particular instruction 122 and may execute the particular instruction 122 to perform radix-3 butterfly computations on a set of inputs in a time domain to produce data in a frequency domain, illustrated as an AddSubD2 instruction execution operation 1680. The set of inputs may be stored in any of the input registers 1690 and sent to the execution unit 1670 during execution of the first instruction. Alternately, or in addition, the set of inputs may be stored in the memory 1602 or the data cache 1612. The data in the frequency domain (i.e., the output produced from execution of the particular instruction 122) may be stored in any of the output registers 1695.

Figure 17:
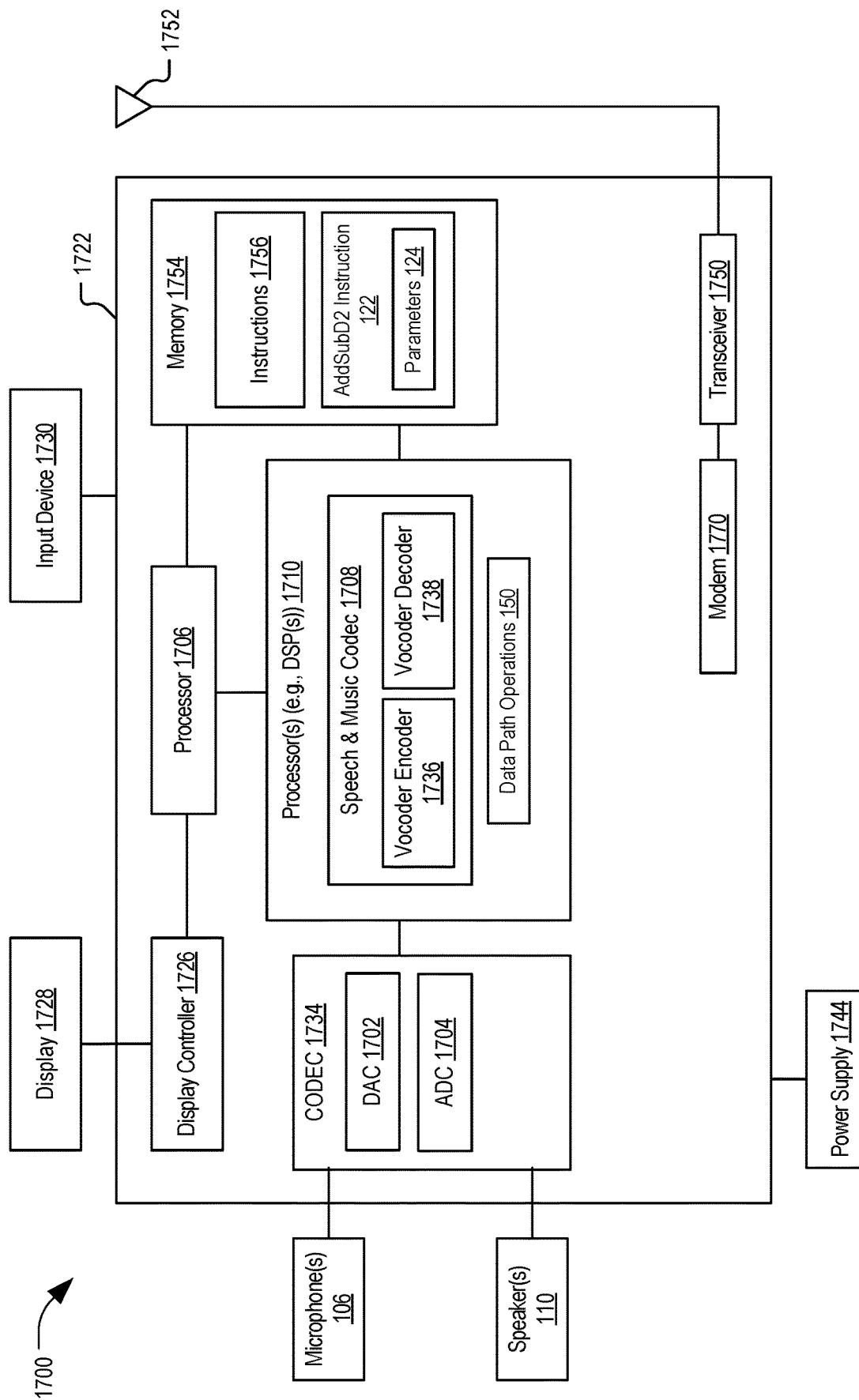
FIG. 17 is a block diagram of a particular illustrative example of a device that is operable to execute an instruction that is applicable to radix-3 butterfly computation, in accordance with some examples of the present disclosure.

Referring to FIG. 17, a block diagram of a particular illustrative implementation of a device is depicted and generally designated 1700. In various implementations, the device 1700 may have more or fewer components than illustrated in FIG. 17. In an illustrative implementation, the device 1700 may correspond to the device 102 of FIG. 1. In an illustrative implementation, the device 1700 may perform one or more operations described with reference to FIGS. 1-16.

In a particular implementation, the device 1700 includes a processor 1706 (e.g., a central processing unit (CPU)). The device 1700 may include one or more additional processors 1710 (e.g., one or more DSPs). In a particular aspect, the processor 190 of FIG. 1 corresponds to the processor 1706, the processors 1710, or a combination thereof. The processors 1710 may include a speech and music coder-decoder (CODEC) 1708 that includes a voice coder ("vocoder") encoder 1736 and a vocoder decoder 1738. The processors 1710 may be configured to perform the datapath operations 150.

The device 1700 may include a memory 1754 and a CODEC 1734. The memory 1754 may include instructions 1756, such as instructions that are executable by the one or more additional processors 1710 (or the processor 1706) to implement functionality associated with a DFT or IDFT, such as the functionality described with reference to the multi-stage DFT 300. The memory 1754 may also include the particular instruction 122, which may be included in the instructions 1756 or called by the instructions 1756, such as in a radix-3 butterfly computation procedure. The device 1700 may include a modem 1770 coupled, via a transceiver 1750, to an antenna 1752.

The device 1700 may include a display 1728 coupled to a display controller 1726. One or more loudspeakers 110, one or more microphones 106, or both may be coupled to the CODEC 1734. The CODEC 1734 may include a digital-to-analog converter (DAC) 1702, an analog-to-digital converter (ADC) 1704, or both. In a particular implementation, the CODEC 1734 may receive analog signals from the microphone 106, convert the analog signals to digital signals using the analog-to-digital converter 1704, and provide the digital signals to the speech and music codec 1708. The speech and music codec 1708 may process the digital signals, such as via transform using the particular instruction 122. In a particular implementation, the speech and music codec 1708 may provide digital signals to the CODEC 1734. The CODEC 1734 may convert the digital signals to analog signals using the digital-to-analog converter 1702 and may provide the analog signals to the loudspeaker 110.

The device 1700 may include a virtual assistant, a home appliance, a smart device, an internet-of-things (IoT) device, a communication device, a headset, a vehicle, a computer, a display device, a television, a gaming console, a music player, a radio, a video player, an entertainment unit, a personal media player, a digital video player, a camera, a navigation device, a smart speaker, a speaker bar, a mobile communication device, a smart phone, a cellular phone, a laptop computer, a tablet, a personal digital assistant, a digital video disc (DVD) player, a tuner, an augmented reality headset, a virtual reality headset, an aerial vehicle, a home automation system, a voice-activated device, a wireless speaker and voice activated device, a portable electronic device, a car, a vehicle, a computing device, a virtual reality (VR) device, a base station, a mobile device, or any combination thereof.

In conjunction with the described implementations, an apparatus includes means for storing a particular instruction. In an example, the means for storing the particular instruction includes the memory 120, the device 102, the memory 1602, the instruction cache 1650, the memory 1754, the device 1700, one or more other circuits or components configured to store the particular instruction, or any combination thereof.

The apparatus also includes means for executing the particular instruction. In an example, the means for executing the particular instruction includes the processor 190, the device 102, one or more of the computation lanes 590-598, the execution unit 1670, the processor 1706, the one or more processors 1710, the device 1700, one or more other circuits or components configured to execute the particular instruction, or any combination thereof.

The means for executing the particular instruction includes means for generating first output data of the particular instruction corresponding to a sum of first input data and second input data of the particular instruction. In an example, the means for generating the first output data includes the processor 190, the arithmetic unit 536, one or more of the computation lanes 590-598, the execution unit 1670, the processor 1706, the one or more processors 1710, one or more other circuits or components configured to generate the first output, or any combination thereof.

The means for executing the particular instruction includes means for performing a divide operation on the second input data. In an example, the means for performing a divide operation on the second input data includes the processor 190, the incrementor 532, the shifter 534, one or more of the computation lanes 590-598, the execution unit 1670, the processor 1706, the one or more processors 1710, one or more other circuits or components configured to perform a divide operation on the second input data, or any combination thereof.

The means for executing the particular instruction also includes means for generating second output data of the particular instruction, the second output data corresponding to a difference of the first input data and a result of the divide operation. In an example, the means for generating the second output data of the particular instruction includes the processor 190, the arithmetic unit 536, one or more of the computation lanes 590-598, the execution unit 1670, the processor 1706, the one or more processors 1710, one or more other circuits or components configured to generate the second output data of the particular instruction, or any combination thereof.

In some implementations, a non-transitory computer-readable medium (e.g., a computer-readable storage device, such as the memory 120, the memory 1602, or the memory 1754) includes instructions (e.g., the instructions 1756) that, when executed by one or more processors (e.g., the one or more processors 190, the system 1600, the one or more processors 1710, or the processor 1706), cause the one or more processors to, during execution of a particular instruction (e.g., the particular instruction 122), generate first output data (e.g., the first output data 170) corresponding to a sum of first input data (e.g., the first input data 126) and second input data (e.g., the second input data 128), perform a divide operation (e.g., the divide operation 156) on the second input data, and generate second output data (e.g., the second output data 172) corresponding to a difference (e.g., the difference 162) of the first input data and a result (e.g., the result 158) of the divide operation.

Particular aspects of the disclosure are described below in a set of interrelated clauses:

According to Clause 1, a device includes: a memory configured to store instructions; and a processor configured to receive a particular instruction from among the instructions and to execute the particular instruction to: generate first output data corresponding to a sum of first input data and second input data; perform a divide operation on the second input data; and generate second output data corresponding to a difference of the first input data and a result of the divide operation.

Clause 2 includes the device of Clause 1, wherein the first input data corresponds to a first vector having multiple first values, the second input data corresponds to a second vector having multiple second values, and wherein the processor executes the particular instruction as a vector instruction that operates in parallel on each first value of the multiple first values with a corresponding second value of the multiple second values.

Clause 3 includes the device of Clause 2, wherein the processor is configured, during execution of the particular instruction, to: access the first vector from a first input vector register indicated by a first parameter of the particular instruction; access the second vector from a second input vector register indicated by a second parameter of the particular instruction; write the first output data to a first output vector register; and write the second output data to a second output vector register.

Clause 4 includes the device of Clause 3, wherein the particular instruction has a format of Vdd=addsubd2 (Vu, Vv), wherein Vu indicates the first input vector register, Vv indicates the second input vector register, and Vdd indicates the first output vector register and the second output vector register.

Clause 5 includes the device of any of Clause 1 to Clause 4, wherein the processor is configured to execute the particular instruction during a radix-3 butterfly computation of a discrete Fourier transform operation.

Clause 6 includes the device of Clause 5, wherein: the radix-3 butterfly computation is configured to generate first transform output data, second transform output data, and third transform output data based on first transform input data, second transform input data, and third transform input data; and the processor is configured to execute the particular instruction using the first transform input data as the first input data and using a sum of the second transform input data and the third transform input data as the second input data.

Clause 7 includes the device of Clause 6, wherein: the first transform output data corresponds to the first output data; the second transform output data corresponds to an addition of the second output data and a multiplicative product of: a complex coefficient; and a first difference of the second transform input data and the third transform input data; and the third transform output data corresponds to a second difference of the second output data and the multiplicative product.

Clause 8 includes the device of any of Clause 1 to Clause 7, wherein the divide operation corresponds to a divide by two with rounding operation.

Clause 9 includes the device of Clause 8, wherein the processor includes a datapath including: an incrementor configured to increment the second input data by one to generate an incremented second input value; a shifter coupled to the incrementor and configured to bit-shift the incremented second input value to generate a result of the divide by two with rounding operation; and an arithmetic unit coupled to the shifter.

Clause 10 includes the device of Clause 9, wherein the arithmetic unit is configured to: generate the first output data in a first phase of execution of the particular instruction; and generate the second output data in a second phase of execution of the particular instruction.

According to Clause 11, a method of executing a particular instruction includes: generating, at a processor, first output data of the particular instruction, the first output data corresponding to a sum of first input data and second input data of the particular instruction; performing, at the processor, a divide operation on the second input data; and generating, at the processor, second output data of the particular instruction, the second output data corresponding to a difference of the first input data and a result of the divide operation.

Clause 12 includes the method of Clause 11, wherein the first input data corresponds to a first vector having multiple first values, the second input data corresponds to a second vector having multiple second values, and wherein the particular instruction is executed as a vector instruction that operates in parallel on each first value of the multiple first values with a corresponding second value of the multiple second values.

Clause 13 includes the method of Clause 12, wherein executing the particular instruction further includes: accessing the first vector from a first input vector register indicated by a first parameter of the particular instruction; accessing the second vector from a second input vector register indicated by a second parameter of the particular instruction; writing the first output data to a first output vector register; and writing the second output data to a second output vector register.

Clause 14 includes the method of Clause 13, wherein the particular instruction has a format of Vdd=addsubd2 (Vu, Vv), wherein Vu indicates the first input vector register, Vv indicates the second input vector register, and Vdd indicates the first output vector register and the second output vector register.

Clause 15 includes the method of any of Clause 11 to Clause 14, wherein the particular instruction is executed as part of a radix-3 butterfly computation of a discrete Fourier transform operation.

Clause 16 includes the method of Clause 15, wherein: the radix-3 butterfly computation includes generating first transform output data, second transform output data, and third transform output data based on first transform input data, second transform input data, and third transform input data; and the particular instruction is executed using the first transform input data as the first input data and using a sum of the second transform input data and the third transform input data as the second input data.

Clause 17 includes the method of Clause 16, further including: generating a multiplicative product of: a complex coefficient; and a first difference of the second transform input data and the third transform input data; generating the second transform output data as an addition of the second output data and the multiplicative product; and generating the third transform output data as a second difference of the second output data and the multiplicative product, wherein the first transform output data corresponds to the first output data.

Clause 18 includes the method of any of Clause 11 to Clause 17, wherein the divide operation corresponds to a divide by two with rounding operation.

Clause 19 includes the method of Clause 18, wherein the performing the divide operation includes: incrementing the second input data by one to generate an incremented second input value; and bit-shifting the incremented second input value to generate a result of the divide by two with rounding operation.

Clause 20 includes the method of any of Clause 11 to Clause 19, wherein the first output data is generated in a first phase of execution of the particular instruction, and wherein the second output data is generated in a second phase of execution of the particular instruction.

According to Clause 21, a device including: a memory configured to store instructions; and a processor configured to execute the instructions to perform the method of any of Clause 11 to Clause 20.

According to Clause 22, a non-transitory computer-readable medium stores instructions that, when executed by a processor, cause the processor to perform the method of any of Clause 11 to Clause 20.

According to Clause 23, an apparatus includes means for carrying out the method of any of Clause 11 to Clause 20.

According to Clause 24. A non-transitory computer-readable medium storing instructions that, when executed by one or more processors, cause the one or more processors to, during execution of a particular instruction: generate first output data corresponding to a sum of first input data and second input data; perform a divide operation on the second input data; and generate second output data corresponding to a difference of the first input data and a result of the divide operation.

Clause 25 includes the non-transitory computer-readable medium of Clause 24, wherein the instructions are executable to cause the one or more processors to, during the execution of the particular instruction: accessing the first input data from a first input vector register indicated by a first parameter of the particular instruction; accessing the second input data from a second input vector register indicated by a second parameter of the particular instruction; writing the first output data to a first output vector register; and writing the second output data to a second output vector register.

Clause 26 includes the non-transitory computer-readable medium of Clause 25, wherein the particular instruction has a format of Vdd=addsubd2(Vu, Vv), wherein Vu indicates the first input vector register, Vv indicates the second input vector register, and Vdd indicates the first output vector register and the second output vector register.

Clause 27 includes the non-transitory computer-readable medium of any of Clause 24 to Clause 26, wherein the instructions are executable to cause the one or more processors to execute the particular instruction as part of a radix-3 butterfly computation of a discrete Fourier transform operation.

Clause 28 includes the non-transitory computer-readable medium of Clause 27, wherein: the radix-3 butterfly computation includes generating first transform output data, second transform output data, and third transform output data based on first transform input data, second transform input data, and third transform input data; and the particular instruction is executed using the first transform input data as the first input data and using a sum of the second transform input data and the third transform input data as the second input data.

Clause 29 includes the non-transitory computer-readable medium of any of Clause 24 to Clause 28, wherein the divide operation corresponds to a divide by two with rounding operation.

Clause 30 includes the non-transitory computer-readable medium of any of Clause 24 to Clause 29, wherein the instructions are executable to cause the one or more processors to generate the first output data in a first phase of execution of the particular instruction and to generate the second output data in a second phase of execution of the particular instruction.

According to Clause 31, an apparatus includes: means for storing a particular instruction; and means for executing the particular instruction, the means for executing the particular instruction including: means for generating first output data of the particular instruction corresponding to a sum of first input data and second input data of the particular instruction; means for performing a divide operation on the second input data; and means for generating second output data of the particular instruction, the second output data corresponding to a difference of the first input data and a result of the divide operation.

Clause 32 includes the apparatus of Clause 31, wherein the means for executing is configured to execute the particular instruction as part of a radix-3 butterfly computation of a discrete Fourier transform operation.

Clause 33 includes the apparatus of Clause 31 or Clause 32, wherein the means for storing and the means for executing are integrated into at least one of a smart speaker, a speaker bar, a display device, a television, a gaming console, a music player, a camera, a navigation device, a vehicle, a headset, an augmented reality headset, a mixed reality headset, a virtual reality headset, an aerial vehicle, a home automation system, a voice-activated device, a wireless speaker and voice activated device, a computing device, a communication device, an internet-of-things (IoT) device, a virtual reality (VR) device, a base station, or a mobile device.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
   a memory configured to store instructions including a first radix-2 butterfly instruction, a particular instruction, and a second radix-2 butterfly instruction; and
   a processor coupled to the memory and configured to receive and execute the first radix-2 butterfly instruction, the particular instruction, and the second radix-2 butterfly instruction during a radix-3 butterfly computation of a discrete Fourier transform operation or an inverse discrete Fourier transform operation, wherein the processor is configured to execute the particular instruction to:
   in a first phase of execution of the particular instruction:
      generate, at an arithmetic unit of the processor, first output data corresponding to a sum of first input data obtained from a first input vector register indicated by one or more parameters of the particular instruction and second input data obtained from a second input vector register indicated by the one or more parameters of the particular instruction, the second input data comprising a first output generated during execution of the first radix-2 butterfly instruction; and
      perform, at divide circuitry of the processor that is coupled to the arithmetic unit, a divide operation on the second input data; and
   in a second phase of execution of the particular instruction:
      generate, at the arithmetic unit, second output data corresponding to a difference of the first input data and a result of the divide operation.

2. The device of claim 1, wherein the first input data corresponds to a first vector having multiple first values, the second input data corresponds to a second vector having multiple second values, and wherein the processor executes the particular instruction as a vector instruction that operates in parallel on each first value of the multiple first values with a corresponding second value of the multiple second values.

3. The device of claim 2, wherein the processor is configured, during execution of the particular instruction, to:
   access the first vector from the first input vector register indicated by the one or more parameters of the particular instruction;
   access the second vector from the second input vector register indicated by the one or more parameters of the particular instruction;
   write the first output data to a first output vector register indicated by the one or more parameters of the particular instruction; and
   write the second output data to a second output vector register indicated by the one or more parameters of the particular instruction.

4. The device of claim 1, wherein:
   the radix-3 butterfly computation is configured to generate first transform output data, second transform output data, and third transform output data based on first transform input data, second transform input data, and third transform input data; and
   the processor is configured to execute the particular instruction using the first transform input data as the first input data and using a sum of the second transform input data and the third transform input data as the second input data.

5. The device of claim 4, wherein:
   the first transform output data corresponds to the first output data;
   the second transform output data corresponds to an addition of the second output data and a multiplicative product of:
      a complex coefficient; and
      a first difference of the second transform input data and the third transform input data; and
   the third transform output data corresponds to a second difference of the second output data and the multiplicative product.

6. The device of claim 1, wherein the divide circuitry includes a shifter, wherein the divide circuitry is configured to access the second input data in the first phase, and wherein the arithmetic unit is configured to access the result of the divide operation in the second phase.

7. The device of claim 1, wherein the divide operation corresponds to a divide by two with rounding operation, and wherein the processor includes:
   a plurality of arithmetic units, wherein each of the plurality of arithmetic units is coupled to the first input vector register configured to store the first input data, the second input vector register configured to store the second input data, a first output vector register configured to store the first output data, and a second output vector register configured to store the second output data;
   a plurality of incrementors, wherein each of the plurality of incrementors is coupled to the second input vector register;
   a plurality of shifters coupled to the plurality of incrementors; and
   a plurality of parallel computation lanes that each includes a corresponding arithmetic unit of the plurality of arithmetic units, a corresponding incrementor of the plurality of incrementors, and a corresponding shifter of the plurality of shifters,
   wherein a particular computation lane of the plurality of parallel computation lanes includes a datapath comprising:
      an incrementor configured to increment the second input data by one to generate an incremented second input value;
      a shifter configured to bit-shift the incremented second input value to generate a result of the divide by two with rounding operation, the divide circuitry including the incrementor and the shifter; and
      the arithmetic unit coupled to the shifter.

8. The device of claim 7, wherein, for each computation lane of the plurality of parallel computation lanes:
   the corresponding incrementor is configured to access corresponding second input data from the second input vector register and increment the corresponding second input data by one in the first phase to generate a corresponding incremented second input value;

the corresponding shifter is configured to bit-shift the corresponding incremented second input value in the first phase to generate a corresponding result of the divide by two with rounding operation; and the corresponding arithmetic unit is configured to:
access corresponding first input data from the first input vector register and access the corresponding second input data from the second input vector register;
generate corresponding first output data in the first phase;
generate corresponding second output data in the second phase; and
write the corresponding first output data to the first output vector register and write the corresponding second output data to the second output vector register.

9. The device of claim 1, wherein the memory and the processor are integrated into at least one of a mobile device, a headset device, a wearable electronic device, a wireless speaker and voice activated device, a camera device, an extended reality headset, or a vehicle.

10. The device of claim 1, wherein the processor is configured to, during execution of the first radix-2 butterfly instruction:
generate first intermediate data as a sum of first transform input data indicated by a first parameter of the first radix-2 butterfly instruction and second transform input data indicated by a second parameter of the first radix-2 butterfly instruction, wherein the first intermediate data comprises the second input data and corresponds to the first output generated during execution of the first radix-2 butterfly instruction; and
generate second intermediate data as a difference of the first transform input data and the second transform input data.

11. The device of claim 10, wherein the first output data comprises first radix transform output data, and wherein the processor is configured to, during execution of the second radix-2 butterfly instruction:
generate third intermediate data as a product of the second intermediate data and a coefficient value;
generate second radix transform output data as a sum of the third intermediate data and the second output data; and
generate third radix transform output data as a difference of the third intermediate data and the second output data.

12. The device of claim 1, wherein the arithmetic unit is configured to:
in the first phase of execution of the particular instruction, receive the first input data and the second input data; and
in the second phase of execution of the particular instruction, receive the first input data and the result of the divide operation.

13. The device of claim 1, wherein the processor includes:
a plurality of parallel computation lanes configured to access the first input vector register, the second input vector register, a first output vector register configured to store the first output data, and a second output vector register configured to store the second output data, wherein:
each computation lane of the plurality of parallel computation lanes includes a corresponding arithmetic unit and corresponding divide circuitry, and the plurality of parallel computation lanes includes a number of computation lanes that is the same as a particular number of data samples stored by each of the first input vector register and the second input vector register.

14. The device of claim 1, wherein the second output data comprises a first input of the second radix-2 butterfly instruction.

15. The device of claim 1, wherein:
the first input data comprises a first plurality of complex values,
the second input data comprises a second plurality of complex values, and
the processor executes the particular instruction as a vector instruction that operates in parallel on pairs of complex values of the first plurality of complex values and the second plurality of complex values to evaluate a plurality of radix-3 butterfly computations as part of the discrete Fourier transform operation or the inverse discrete Fourier transform operation.

16. The device of claim 1, wherein:
the device further comprises a microphone configured to capture audio samples,
the first input data, the second input data, or both, comprise the audio samples, and
performance of the discrete Fourier transform operation converts the audio samples from the time domain to the frequency domain.

17. A method of executing a particular instruction, the method comprising:
in a first phase of execution of the particular instruction during a radix-3 butterfly computation of a discrete Fourier transform operation or an inverse discrete Fourier transform operation, wherein a first radix-2 butterfly instruction, the particular instruction, and a second radix-2 butterfly instruction are executed during the radix-3 butterfly computation:
generating, at an arithmetic unit of a processor, first output data of the particular instruction, the first output data corresponding to a sum of first input data obtained from a first input vector register indicated by one or more parameters of the particular instruction and second input data obtained from a second input vector register indicated by the one or more parameters of the particular instruction, the second input data comprising a first output generated during execution of the first radix-2 butterfly instruction; and
performing, at divide circuitry of the processor that is coupled to the arithmetic unit, a divide operation on the second input data; and
in a second phase of execution of the particular instruction:
generating, at the arithmetic unit of the processor, second output data of the particular instruction, the second output data corresponding to a difference of the first input data and a result of the divide operation.

18. The method of claim 17, wherein the first input data corresponds to a first vector having multiple first values, the second input data corresponds to a second vector having multiple second values, and wherein the particular instruction is executed as a vector instruction that operates in parallel on each first value of the multiple first values with a corresponding second value of the multiple second values.

19. The method of claim 18, wherein executing the particular instruction further includes:
   accessing the first vector from the first input vector register indicated by the one or more parameters of the particular instruction;
   accessing the second vector from the second input vector register indicated by the one or more parameters of the particular instruction;
   writing the first output data to a first output vector register indicated by the one or more parameters of the particular instruction; and
   writing the second output data to a second output vector register indicated by the one or more parameters of the particular instruction.

20. The method of claim 17, wherein:
   the radix-3 butterfly computation includes generating first transform output data, second transform output data, and third transform output data based on first transform input data, second transform input data, and third transform input data; and
   the particular instruction is executed using the first transform input data as the first input data and using a sum of the second transform input data and the third transform input data as the second input data.

21. The method of claim 20, further comprising:
   generating a multiplicative product of:
      a complex coefficient; and
      a first difference of the second transform input data and the third transform input data;
   generating the second transform output data as an addition of the second output data and the multiplicative product; and
   generating the third transform output data as a second difference of the second output data and the multiplicative product,
   wherein the first transform output data corresponds to the first output data.

22. The method of claim 17, wherein the divide operation corresponds to a divide by two with rounding operation.

23. The method of claim 22, wherein the performing the divide operation includes, in the first phase:
   incrementing the second input data by one to generate an incremented second input value; and
   bit-shifting the incremented second input value to generate a result of the divide by two with rounding operation.

24. The method of claim 17, further comprising:
   in the first phase and in parallel with generation of the first output data and performance of the divide operation:
      generating, at one or more additional arithmetic units of the processor, corresponding additional first output data values of the particular instruction, the corresponding additional first output data values comprising a sum of corresponding first input data values obtained from the first input vector register and corresponding second input data values obtained from the second input vector register of the particular instruction; and
      performing, at one or more additional divide circuitries of the processor that are coupled to the one or more additional arithmetic units, corresponding divide operations on the corresponding second input data values; and
   in the second phase and in parallel with generation of the second output data:
      generating, at the one or more additional arithmetic units of the processor, corresponding second output data values of the particular instruction, the corresponding second output data values corresponding to a difference of the corresponding first input data values and a result of the corresponding divide operation.

25. A non-transitory computer-readable medium storing instructions that, when executed by one or more processors, cause the one or more processors to, during execution of a particular instruction:
   in a first phase of execution of the particular instruction during a radix-3 butterfly computation of a discrete Fourier transform operation or an inverse discrete Fourier transform operation, wherein a first radix-2 butterfly instruction, the particular instruction, and a second radix-2 butterfly instruction are executed during the radix-3 butterfly computation:
      generate, at an arithmetic unit of the one or more processors, first output data corresponding to a sum of first input data obtained from a first input vector register indicated by one or more parameters of the particular instruction and second input data obtained from a second input vector register indicated by the one or more parameters of the particular instruction, the second input data comprising a first output generated during execution of the first radix-2 butterfly instruction;
      perform, at divide circuitry of the one or more processors that is coupled to the arithmetic unit, a divide operation on the second input data; and
   in a second phase of execution of the particular instruction:
      generate, at the arithmetic unit, second output data corresponding to a difference of the first input data and a result of the divide operation.

26. The non-transitory computer-readable medium of claim 25, wherein the instructions are executable to cause the one or more processors to, during the execution of the particular instruction:
   accessing the first input data from the first input vector register indicated by the one or more parameters of the particular instruction;
   accessing the second input data from the second input vector register indicated by the one or more parameters of the particular instruction;
   writing the first output data to a first output vector register indicated by the one or more parameters of the particular instruction; and
   writing the second output data to a second output vector register indicated by the one or more parameters of the particular instruction.

27. The non-transitory computer-readable medium of claim 25, wherein:
   the radix-3 butterfly computation includes generating first transform output data, second transform output data, and third transform output data based on first transform input data, second transform input data, and third transform input data; and
   the particular instruction is executed using the first transform input data as the first input data and using a sum of the second transform input data and the third transform input data as the second input data.

28. The non-transitory computer-readable medium of claim 25, wherein the divide operation corresponds to a divide by two with rounding operation, and wherein the divide circuitry includes an incrementor and a shifter coupled to the incrementor.

29. An apparatus comprising:

means for storing a first radix-2 butterfly instruction, a particular instruction, and a second radix-2 butterfly instruction; and means for executing the particular instruction during a radix-3 butterfly computation of a discrete Fourier transform operation or an inverse discrete Fourier transform operation, the first radix-2 butterfly instruction, the particular instruction, and the second radix-2 butterfly instruction being executed during the radix-3 butterfly computation, the means for executing the particular instruction comprising:

means for generating, in a first phase of execution of the particular instruction, first output data of the particular instruction corresponding to a sum of first input data obtained from a first input vector register and second input data obtained from a second input vector register and for generating, in a second phase of execution of the particular instruction, second output data of the particular instruction, the second input data comprising a first output generated during execution of the first radix-2 butterfly instruction; and means for performing, in the first phase, a divide operation on the second input data, the means for performing the divide operation coupled to the means for generating the first output data and the second output data, the second output data corresponding to a difference of the first input data and a result of the divide operation.

30. The apparatus of claim 29, wherein the means for storing and the means for executing are integrated into at least one of a smart speaker, a speaker bar, a display device, a television, a gaming console, a music player, a camera, a navigation device, a vehicle, a headset, an augmented reality headset, a mixed reality headset, a virtual reality headset, an aerial vehicle, a home automation system, a voice-activated device, a wireless speaker and voice activated device, a computing device, a communication device, an internet-of-things (IoT) device, a virtual reality (VR) device, a base station, or a mobile device.

* * * * *